(12) United States Patent
Thackeray et al.

(10) Patent No.: US 6,528,208 B1
(45) Date of Patent: Mar. 4, 2003

(54) ANODES FOR RECHARGEABLE LITHIUM BATTERIES

(75) Inventors: Michael M. Thackeray, Naperville, IL (US); Keith D. Kepler, Mountain View, CA (US); John T. Vaughey, Elmhurst, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 09/622,617

(22) PCT Filed: Oct. 15, 1999

(86) PCT No.: PCT/US99/24168

§ 371 (c)(1),
(2), (4) Date: Oct. 26, 2000

(87) PCT Pub. No.: WO00/38258

PCT Pub. Date: Jun. 29, 2000

Related U.S. Application Data

(60) Provisional application No. 60/092,206, filed on Jul. 9, 1998, and provisional application No. 60/142,312, filed on Dec. 21, 1998.

(51) Int. Cl.⁷ .................................................. H01M 4/38
(52) U.S. Cl. .............................. 429/218.1; 429/231.95
(58) Field of Search .................... 252/182.1; 429/218.1, 429/231.1, 231.95

(56) References Cited

U.S. PATENT DOCUMENTS 5,770,333 A * 6/1998 Saito et al. ............... 252/182.1
6,203,944 B1 * 3/2001 Turner et al. ............. 252/182.1

OTHER PUBLICATIONS

Yang et al., Solid State Ionics, 90 (1996) pp. 281–287.*

* cited by examiner

Primary Examiner—Carol Chaney
(74) Attorney, Agent, or Firm—Emrich & Dithmar

(57) ABSTRACT

A negative electrode (12) for a non-aqueous electrochemical cell (10) with an intermetallic host structure containing two or more elements selected from the metal elements and silicon, capable of accommodating lithium within its crystallographic host structure such that when the host structure is lithiated it transforms to a lithiated zinc-blende-type structure. Both active elements (alloying with lithium) and inactive elements (non-alloying with lithium) are disclosed. Electrochemical cells and batteries as well as methods of making the negative electrode are disclosed.

41 Claims, 29 Drawing Sheets

○ Cu
● Sn

○ Ni
● In

○ Ni/Co
● Sn

○ Li
● Cu
● Sn

Sn ●
Li,Cu ◐
Li ◌

Cu ●  Sn ○

ANODES FOR RECHARGEABLE LITHIUM BATTERIES

RELATED APPLICATIONS

This application is based upon provisional application Ser. No. 60/092,206, filed Jul. 9, 1998, and upon provisional application Ser. No. 60/142,312 filed Dec. 21, 1998, and is a continuation-in-part of PCT application Ser. No. PCT/US99/12868 filed Jun. 8, 1999, and is a continuation-in-part of PCT/US99/18811 filed Aug. 17, 1999 which PCT application was abandoned.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

This invention relates to new anode materials for lithium ion batteries. More specifically this invention relates to new anode materials for lithium-ion batteries consisting of intermetallic materials having active and inactive metals with respect to lithium, such as for instance Sn and Cu metals, respectively. Lithium-ion batteries are under development for the consumer electronics market such as cellular phones, laptop computers, and camcorders. Lithium batteries are also being developed for high energy/power systems such as electric vehicles. A major concern about lithium batteries is safety, primarily when metallic lithium is used as the anode material. This arises because lithium has a very high oxidation potential and thus reactivity in the cell environment. One approach to the safety issue is to use carbon as a host structure for lithium. The carbon can be either graphite or a less crystalline form of pyrolyzed carbon. Lithium-intercalated graphite/carbon electrodes improve the safety of lithium cells, but do not completely overcome the safety problems, because there is still the possibility of depositing metallic lithium at the top of the charge when the voltage of the lithiated carbon/graphite anode approaches that of metallic lithium. Carbon itself when present in a finely divided form with a high surface area, can be highly reactive particularly if oxygen is released within the cell from a highly oxidizing cathode material such as $Li_{1-x}CoO_2$, $Li_{1-x}NiO_2$, and $Li_{1-x}Mn_2O_4$.

There is, therefore, a need to find alternative anode materials to carbon. Many binary lithium alloy systems, such as $Li_xAl$, $Li_xSi$ and $Li_xSn$ have been extensively studied in the past. These alloys undergo several phase transitions during charge and discharge; the structures undergo severe lattice expansion and contraction that limits the cycle-life of the electrode. An improvement in cycle-life has been made by using an amorphous tin oxide negative (anode) electrode, in which the tin ions are initially reduced to a metallic state (during the charge process of lithium-ion cells), and thereafter alloyed with lithium to form a series of phases within the $Li_xSn$ system ($0<x\leq 4.4$). Several high-temperature phases are known, in order of increasing lithium content, they are: $Li_2Sn_5$, LiSn, $Li_7Sn_3$, $Li_5Sn_2$, $Li_{13}Sn_5$, $Li_7Sn_2$ and $Li_{22}Sn_5$; they are generated during the electrochemical reaction of lithium with tin at 400° C. At 25° C., the electrochemical profile has indicated that the compositions of the stable phases are $Li_2Sn_5$, $Li_2Sn_3$, $Li_7Sn_3$, $Li_5Sn_2$, $Li_7Sn_2$ and $Li_{22}Sn_5$. Tin-oxide electrodes suffer an irreversible capacity loss on the first cycle because a significant amount of the lithium is trapped within the charged electrode as lithium oxide. Furthermore, lithium oxide is an insulator, which reduces the electronic conductivity of the electrode, a serious disadvantage since for optimum performance the anode needs to be an electrical conductor.

SUMMARY OF THE INVENTION

We have invented a new anode for a lithium battery by replacing the oxygen of a tin oxide electrode with a metal such as copper, which has not only excellent electrical properties, but also has a low oxidation potential, and therefore a low reactivity in a lithium cell environment; copper foil is also used as the current collector at the negative electrode in conventional $Li_xC_6/Li_{1-x}CoO_2$ lithium-ion cells. More generally, the invention relates to the use of intermetallic compounds, based on the structure types of copper-tin and lithium-copper-tin materials, as defined by their relationship to NiAs type, $Ni_2In$ type and lithiated zinc-blende-type materials as anode materials for rechargeable lithium batteries. The invention also includes nonaqueous electrochemical cells incorporating the new anodes and the methods of making the anodes and cells. In the anode, there is one or more of an active metal which can alloy substantially with lithium (such as tin) and, in most instances, there is one or more of an inactive metal which does not substantially alloy with lithium (such as copper). There are other examples in which the anode material components consist of two (or more) active metals that can alloy with lithium, such as tin and germanium.

The invention also includes cells and batteries incorporating the new anode materials with standard state-of-the-art cathodes such as lithium cobalt oxide, lithium nickel oxide or lithium manganese oxides (and various substituted oxides), cathodes now useful in lithium rechargeable batteries.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

FIG. 8c is a representation of the zinc-blende type CuSn framework of the $Li_2CuSn$ structure shown in FIG. 8a;

FIG. 9 is a [001] crystallographic projection of the ordered structure of $Li_2CuSn$ shown in FIG. 8a;

DETAILED DESCRIPTION OF THE INVENTION

Figure 1:
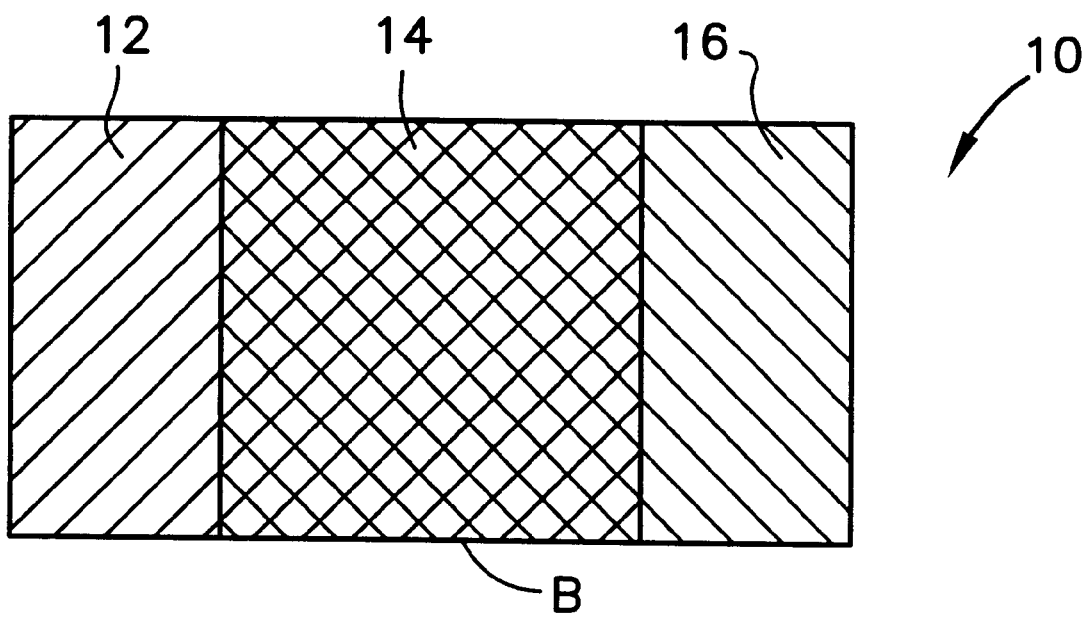
FIG. 1 depicts a schematic illustration of an electrochemical cell.

As prebiously stated, the invention relates to a new anode for use in an electrochemical cell 10 having an anode 12 separated from a cathode 16 by an electrolyte 14, all contained in an insulating housing 18 with suitable terminals (not shown) being provided in electronic contact with the anode 12 and the cathode 16, as shown schematically in FIG. 1. Binders and other materials normally associated with both the electrolyte and the anode and cathode are well known and are not described herein, but are included as is understood by those of ordinary skill in this art.

The anodes of the present invention include intermetallics comprising a substantially active element (or elements) which alloys with lithium with a substantially inactive element (or elements) which does not alloy with lithium, or alternatively, comprising a combination of substantially active alloying elements, the anodes having structure types based on the copper-tin compound $Cu_6Sn_5$ and lithium-copper-tin derivatives, such as the compound $Li_2CuSn$. Metals which are considered active, that is metals which can form a binary alloy with lithium useful in this invention are preferably one or more of Sn, Si, Al, Ga, Ge, In, Bi, Pb, Zn, Cd, Hg and Sb. The substantially inactive elements which do not form substantial binary alloys with Li are selected preferably from the first row of transition metals and more preferably one or more of Cu, Ni, Co, Fe, M, Cr, Ti, V and Sc, and in addition, Mg and Ag along with the noble metals, Pd, Rh, and Ir. More specifically, the preferred combinations of inactive and active metals are Cu and Ni, and one or more of Sn, Ge, Sb, Si and Al. It is understood that the active and inactive metals may be present in a wide variety of ratios as will hereinafter be described with the $Cu_6Sn_5$ and $Li_2CuSn$ intermetallic compounds, by way of example only. It should be understood that various combinations, relative amounts and relative "activities" of both the inactive metals and the active metals may be used in the context of intermetallic compounds without departing from the true spirit and scope of the present invention.

By way of example only, we selected the eta-phase $Cu_6Sn_5$ and the intermetallic phase $Li_2CuSn$ to demonstrate the principles of this invention; in this invention, we describe in detail the structural properties and electrochemical properties of $Cu_6Sn_{5+\delta}$ ($\delta=-3, -1, 0, +1$) and $Li_2CuSn$ electrode materials in cells with metallic lithium electrodes.

The concept of using an intermetallic compound, MM', where M is an "active" alloying element and M' is an "inactive" element (or elements) can be considered, broadly speaking, analogous on a macroscopic scale to a metal oxide insertion electrode, such as $MnO_2$ in which Mn is the electrochemically active ion and O is the inactive ion. In an $MnO_2$ host electrode, lithium ions are inserted into the structure to a composition $LiMnO_2$ with a concomitant reduction of the manganese ions from a tetravalent to a trivalent state. In $MnO_2$, the ratio of the inactive element to active element is 2:1; for the uptake of one lithium ion per manganese ion, the capacity of the $MnO_2$ electrode is 308 mAh/g. Manganese oxides, such as the spinel-related phase, $\lambda$-$MnO_2$, that expand and contract isotopically during lithium insertion and extraction with minimal volume expansion of the unit cell provide greatly enhanced cycling stability compared to manganese oxide structures that expand and contract anisotopically with a large volume increase, as in the ramsdellite-$Li_xMnO_2$ structure.

In an intermetallic system such as $Cu_6Sn_5$, the tin atoms can be regarded, broadly speaking, as the electrochemically active component (because it forms a binary $Li_xSn$ alloy system with Li) and the copper atoms as the inactive component, (because it does not substantially alloy with Li). Lithium insertion into the $Cu_6Sn_5$ structure takes place initially in a topotactic reaction to yield a structure, believed to have the nominal composition $Li_{13}Cu_6Sn_5$, or $Li_{2.17}CuSn_{0.83}$, i.e., with a maximum of 13 Li per $Cu_6Sn_5$ formula unit, which is approximately the same as that of $Li_2CuSn$. Thus during the reaction, the $Cu_6Sn_5$ structure provides a host framework for the uptake of lithium. It is believed that further reaction with lithium necessitates a displacement reaction and a break-up of the $Li_xCu_6Sn_5$ structure; the lithium combines with the active tin to form a series of $Li_xSn$ compounds ($0<x\leqq4.4$) within a residual copper matrix. In this latter-type reaction, the divided copper atoms/particles that are produced on electrochemical cycling would provide an electronically conducting matrix to contain the lithiated tin particles and to accommodate at least some of the damaging expansion/contraction of the $Li_xSn$ particles during discharge and charge (note that in a $Li/Cu_6Sn_5$ cell, extensive discharge means the formation of a "$Li_xCu_6Sn_5$" composite electrode (with $x>\sim13$) consisting of domains of lithiated tin and copper metal). Optimum cycling conditions would be expected from such a composite $Cu/Li_xSn$ material if it had an ideal microstructure in which the Cu and $Li_xSn$ particles were evenly distributed with sufficient porosity to accommodate the reacted lithium, thus allowing a minimal isotropic expansion of the overall electrode. Although it is believed that the initial topotactic reaction provides a $Li_xCu_6Sn_5$ electrode with superior cycling behavior compared to the subsequent displacement reaction, the invention also includes the composite electrodes that are derived over longer-term cycling by the displacement reaction described above and which can yield higher capacities than can be obtained from the topotactic reaction alone.

Figure 2:
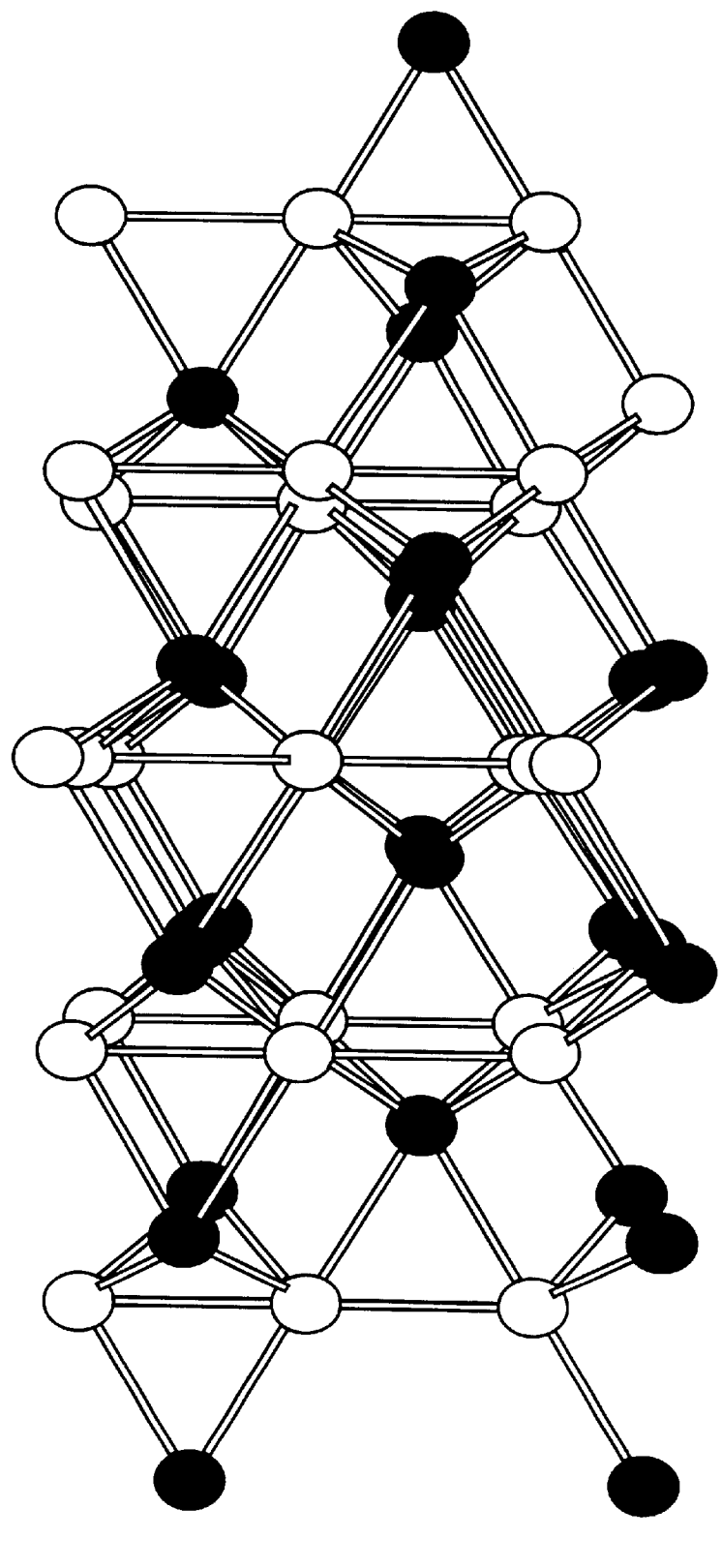
FIG. 2 is a representation of the ideal structure of a high-temperature $Cu_6Sn_5$ intermetallic compound, labeled $\eta$-$Cu_6Sn_5$.

The $Cu_6Sn_5$ structure exists in a high temperature form and a low temperature form. The transition from the one form to the other takes place at 460K as previously reported. The high-temperature structure of $Cu_6Sn_5$, labeled $\eta$-$Cu_6Sn_5$ and shown in FIG. 2, was first reported in 1928 to have the NiAs-type structure. Simplistically, $\eta$-$Cu_6Sn_5$ has a defect NiAs structure in which the Cu atoms adopt the octahedral sites occupied by Ni in NiAs, and the Sn atoms occupy the trigonal prismatic sites adopted by As; there is one vacant trigonal prismatic Sn site per $Cu_6Sn_5$ unit. A recent analysis in 1994, of the room-temperature $Cu_6Sn_5$ structure, labeled $\eta'$-$Cu_6Sn_5$, has shown that this compound has features of both a NiAs-type and a $Ni_2In$-type structure.

Figure 3:
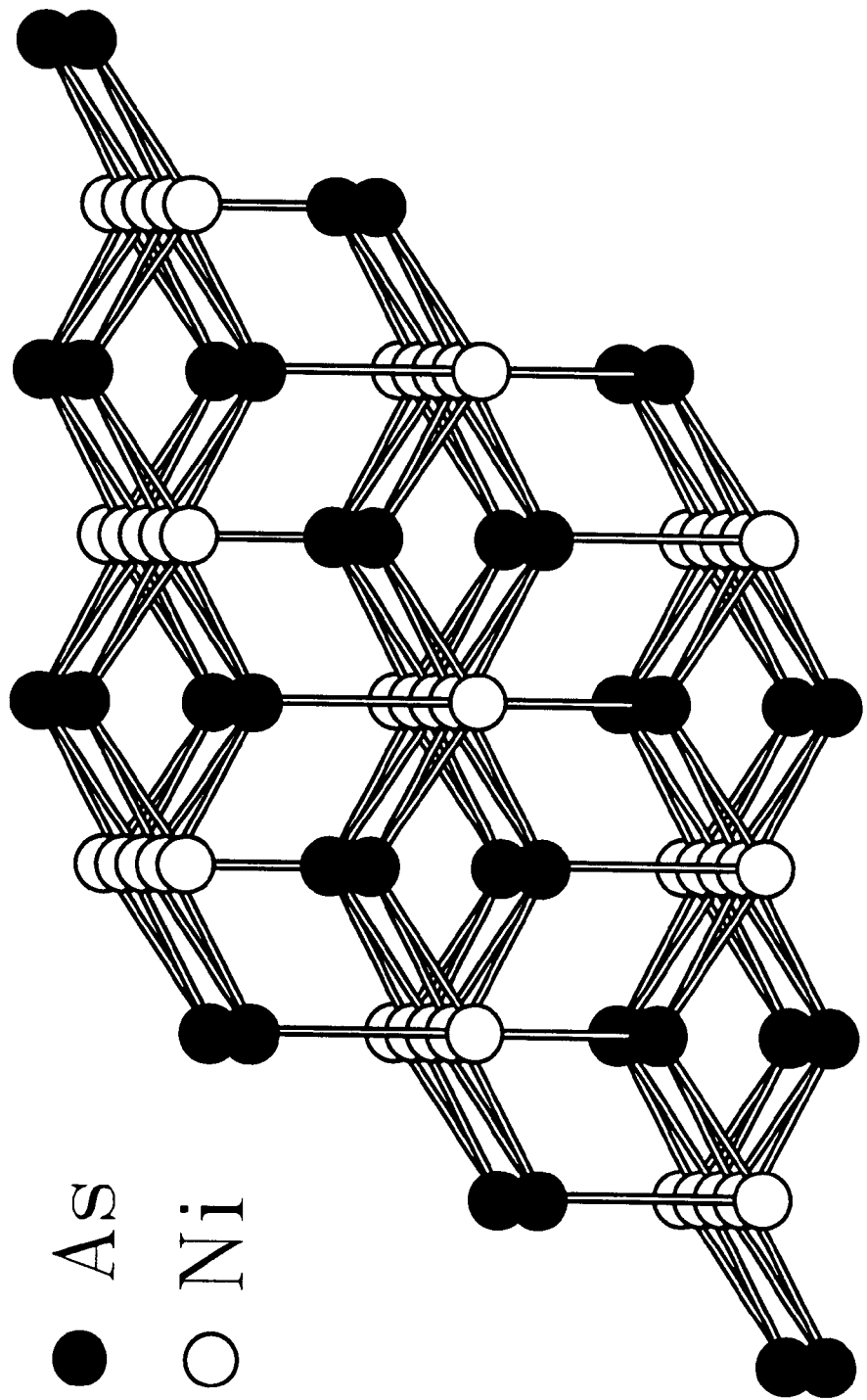
FIG. 3 is a representation of the ideal structure of NiAs.

In the well known NiAs structure, which has a hexagonal-close-packed ABACABAC arrangement of atoms (FIG. 3a), the Ni atoms are octahedrally coordinated to six As atoms, whereas the As atoms are coordinated in trigonal prismatic manner to six Ni atoms. The [001] crystallographic projection of the NiAs structure in FIG. 3 shows that the Ni and As atoms are arranged in strings. There are twice as many As strings as Ni strings. The Ni strings are densely packed, whereas the As strings contain half as many As atoms as there are Ni atoms in the Ni strings. In FIG. 3, the NiAs structure is seen to consist of an array of hexagonal columns, each column consisting of alternating Ni strings and As strings, and each column containing an As string at its center.

Figure 4:
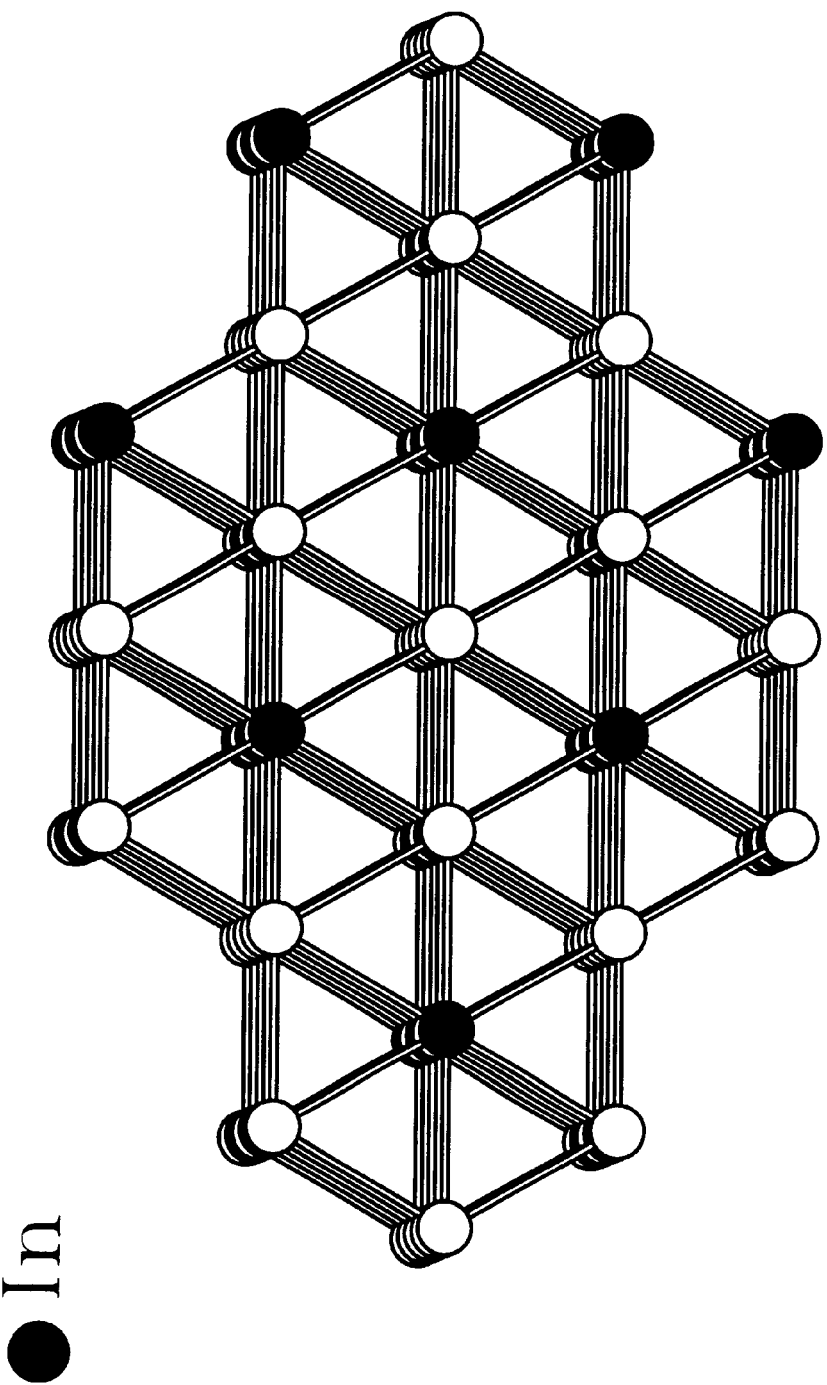
FIG. 4 is a representation of the ideal structure of $Ni_2In$.

The [001] crystallographic projection of the $Ni_2In$ structure is shown in FIG. 4. In this structure, there is a similar hexagonal arrangement of atom strings as described for NiAs (FIG. 3). In $Ni_2In$, however, strings of Ni atoms (octahedrally coordinated to surrounding In atoms) alternate with strings containing both In and Ni atoms to make up the hexagonal columns. In the In—Ni strings, the In atoms have trigonal prismatic coordination to the Ni atoms in neighboring strings; the Ni atoms in the In—Ni strings reside midway between the In atoms in trigonal bipyramidal interstices (with respect to neighboring In atoms) to provide a very dense structure ($\rho$=9.902 g/ml). Each hexagonal column contains, at its center, a similar string of In and Ni atoms.

Figure 5A:
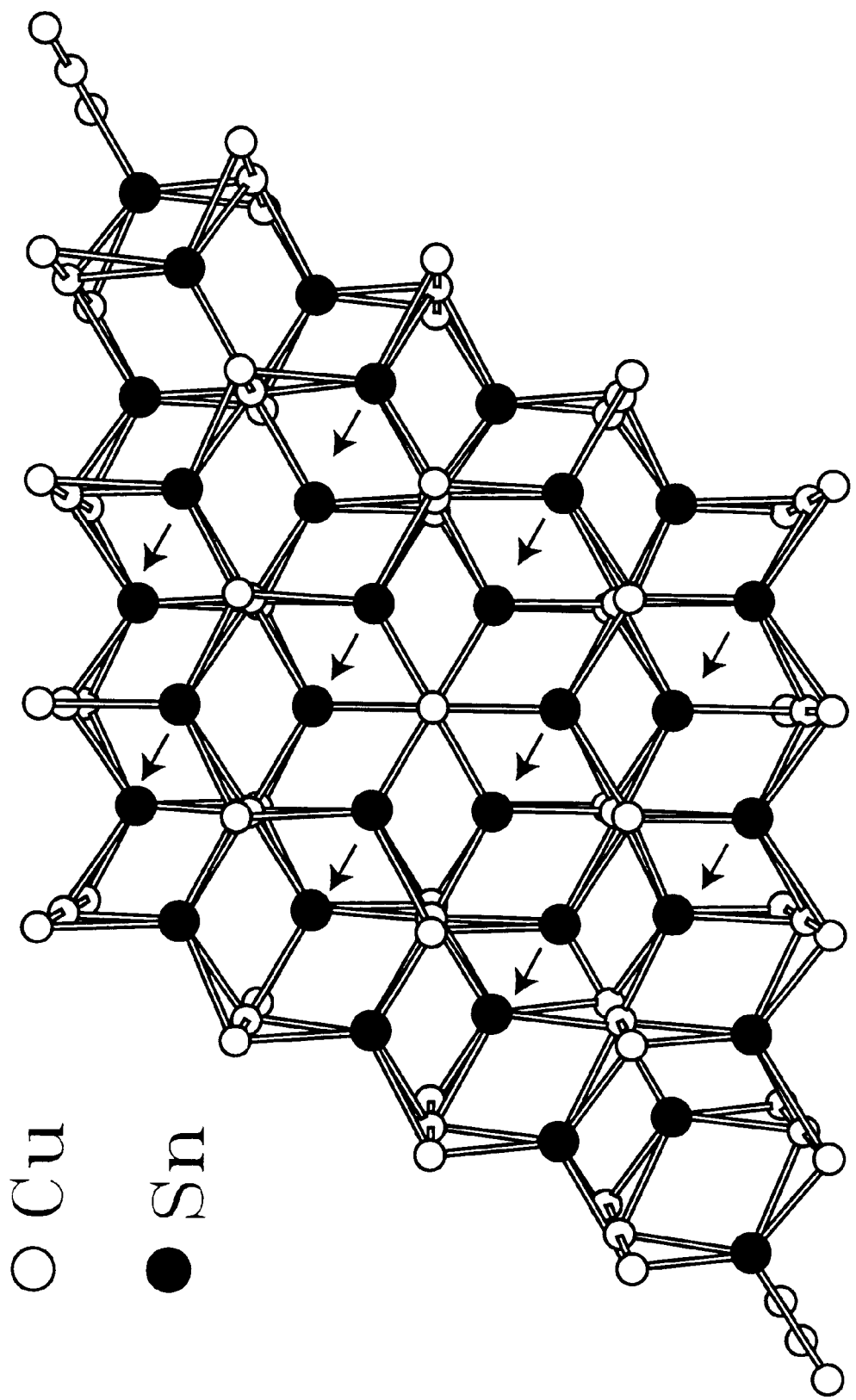
FIG. 5a is a [001] crystallographic projection of the high-temperature structure of $\eta$-$Cu_6Sn_5$ shown in FIG. 2 showing the displacement of Sn atoms that is required for the transformation to a cubic $Li_xCu_6Sn_5$-type structure ($x_{max}$~13)
Figure 5B:
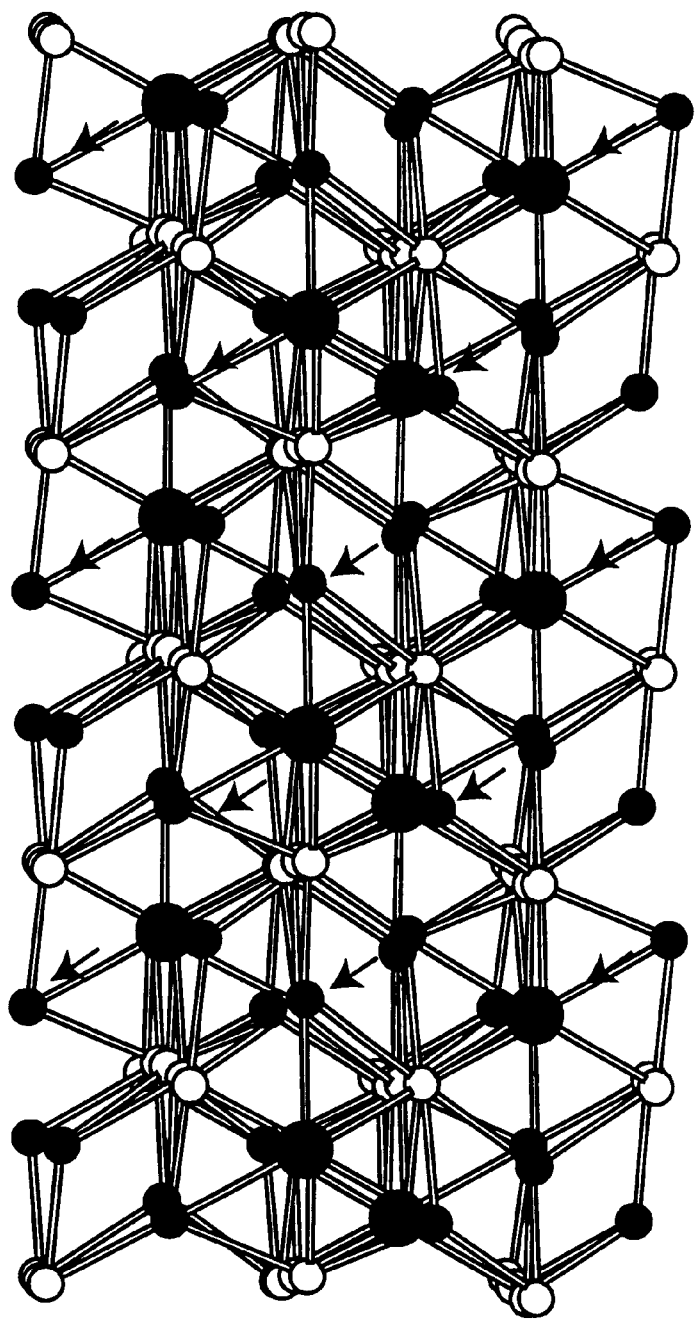
FIG. 5b is a [001] crystallographic projection of the ideal structure of the room-temperature $Cu_6Sn_5$ intermetallic compound, labeled $\eta'$-$Cu_6Sn_5$, showing the displacement of Sn (or Cu) atoms that is required for the transformation to a cubic $Li_xCu_6Sn_5$-type structure.
Figure 6:
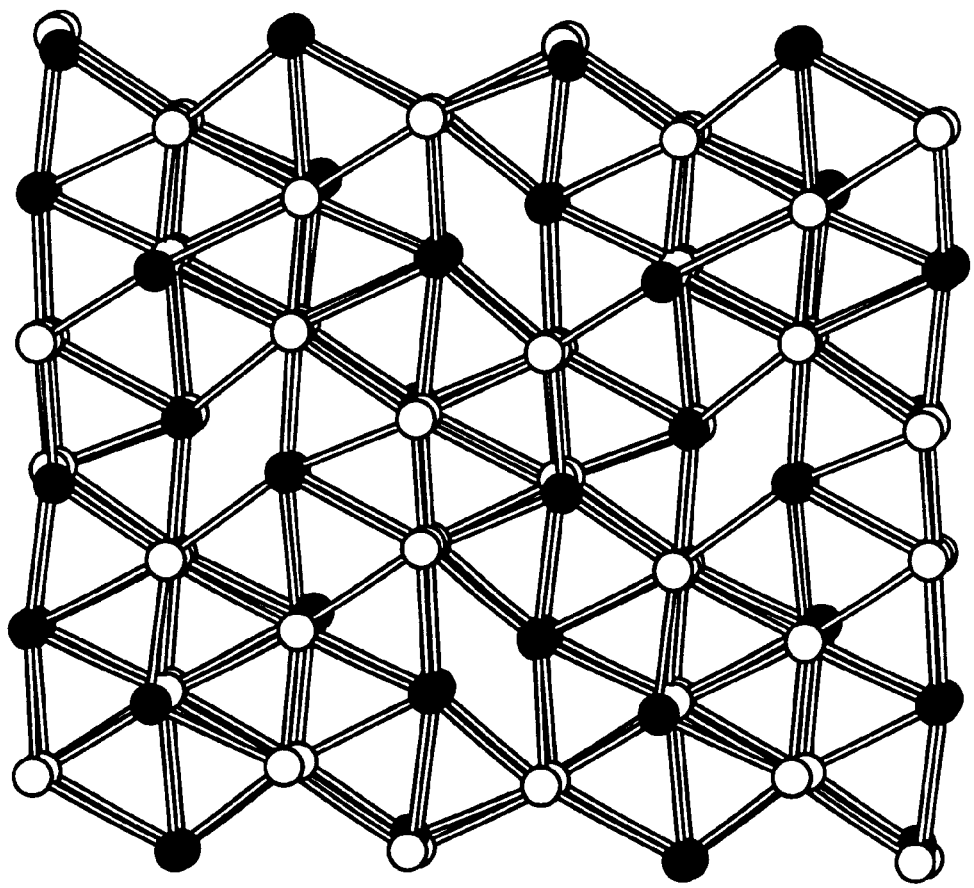
FIG. 6 is a [001] crystallographic projection of the ideal structure of the $Ni_3Sn_2$ (and $Co_3Sn_2$) intermetallic compound.

The close relationship between the high- and low-temperature forms of the $Cu_6Sn_5$ structure and the NiAs and $Ni_2In$ structures can be seen in FIGS. 3, 4, 5a and 5b. In the [001] crystallographic projection of the high-temperature modification, $\eta$-$Cu_6Sn_5$, shown in FIG. 5a, the Cu atoms and the Sn atoms are arranged in discrete strings, as in the NiAs structure (FIG. 3). In the [001] crystallographic projection of the room-temperature modification, $\eta'$-$Cu_6Sn_5$, shown in FIG. 5b, the Cu atoms are arranged in discrete rows as they are in $\eta$-$Cu_6Sn_5$ (FIG. 5a), but in this structure the Sn strings also contain some Cu atoms; these Cu atoms are located between the Sn atoms in trigonal bipyramidal sites, one-fifth of which are occupied in the structure. In $\eta'$-$Cu_6Sn_5$, there exist hexagonal columns that consist of Cu strings that alternate with Sn—Cu strings; the center of the hexagonal columns contain identical Sn—Cu strings. Thus, $\eta'$-$Cu_6Sn_5$ may be regarded as having a defect $Ni_2In$-type structure in which 80% of the trigonal bipyramidal sites are vacant. Intermetallic compounds that are assigned either to the NiAs- or the $Ni_2In$-type structure commonly have a composition between that of NiAs and $Ni_2In$. A superstructure is formed if the structure is ordered. Examples of such superstructures are found in room-temperature modifications of $\eta'$-$Cu_6Sn_5$, $Ni_3Sn_2$, and $Co_3Sn_2$ intermetallic compounds. The [001] crystallographic projection of the $Ni_3Sn_2$ structure (which is isostructural with $Co_3Sn_2$) is shown in FIG. 6; it demonstrates that $Ni_3Sn_2$ (and $Co_3Sn_2$) is of the same structure type as $\eta'$-$Cu_6Sn_5$ (FIG. 5b). In practice, however, it is believed that these structures are not ideally ordered and that some disorder can exist, for example between the copper and tin atom sites in the $Cu_6Sn_5$ structures shown in FIGS. 5a and 5b.

Figure 7:
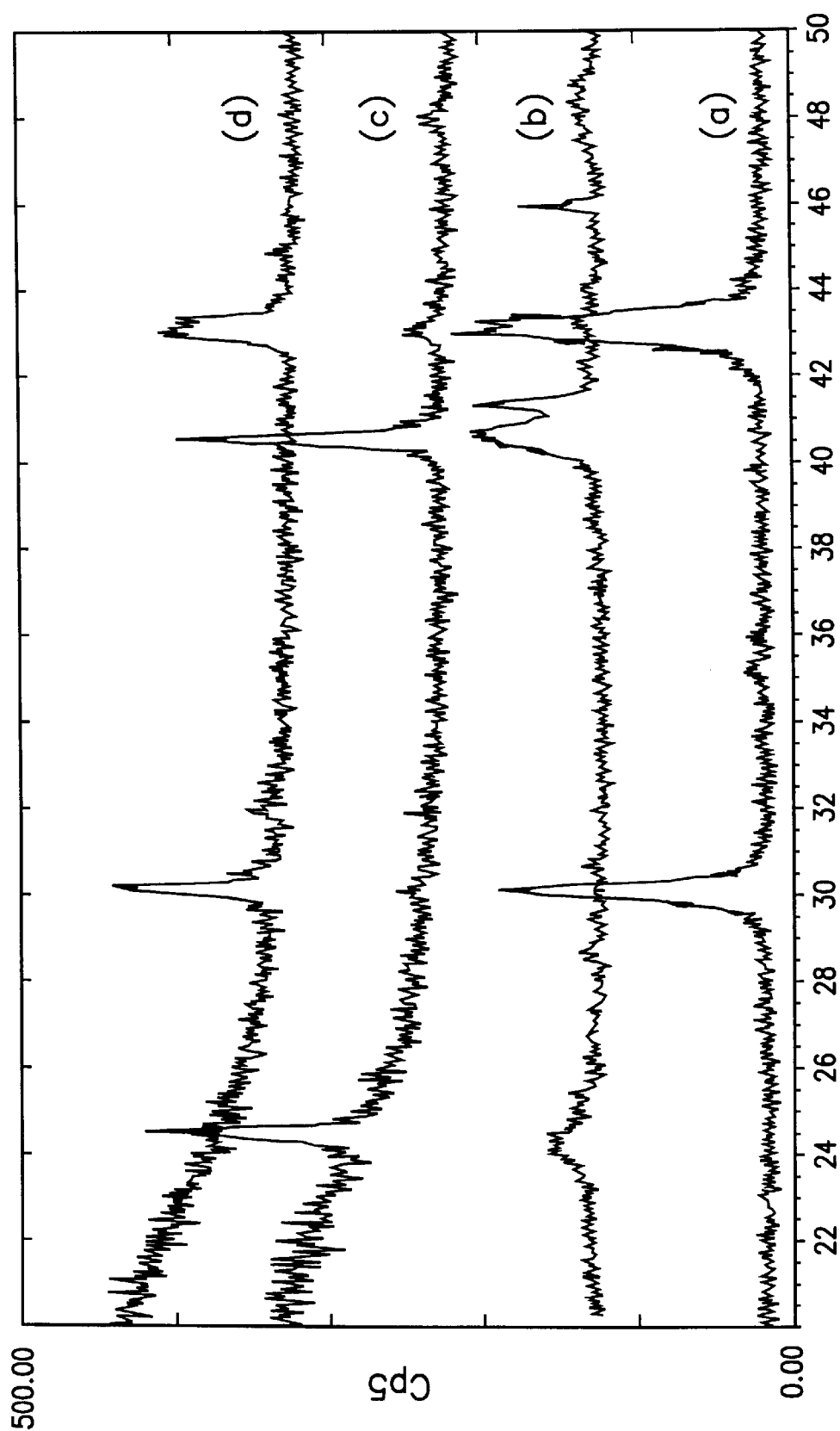
FIG. 7 shows the X-ray diffraction patterns (CuK radiation)of a) a standard $Cu_6Sn_5$ sample at room-temperature, b) $Li_xCu_6Sn_5$ obtained by electrochemical insertion of lithium at room temperature, c) a standard $Li_2CuSn$ sample at room temperature, and d) a chemically delithiated sample of $Li_2CuSn$ at room temperature.
Figure 8A:
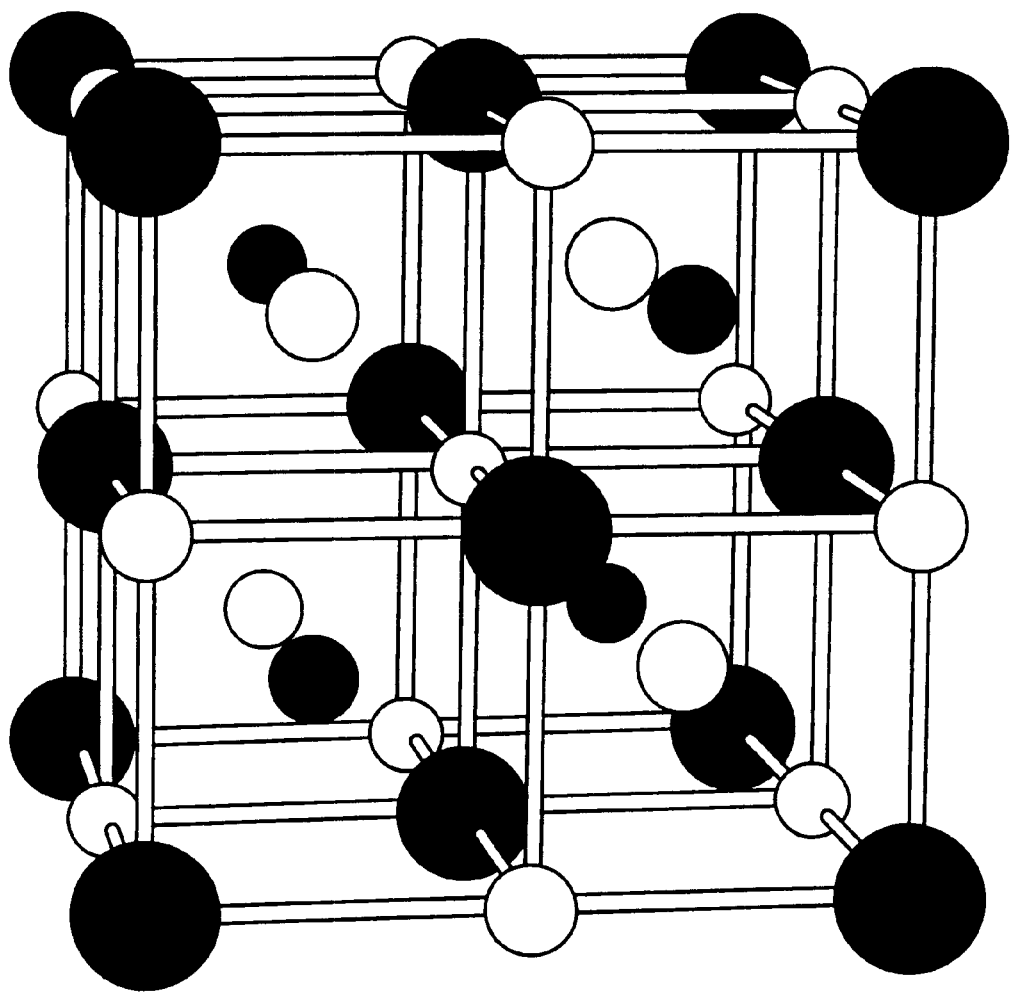
FIG. 8a is a representation of the ordered room-temperature structure of $Li_2CuSn$.
Figure 8B:
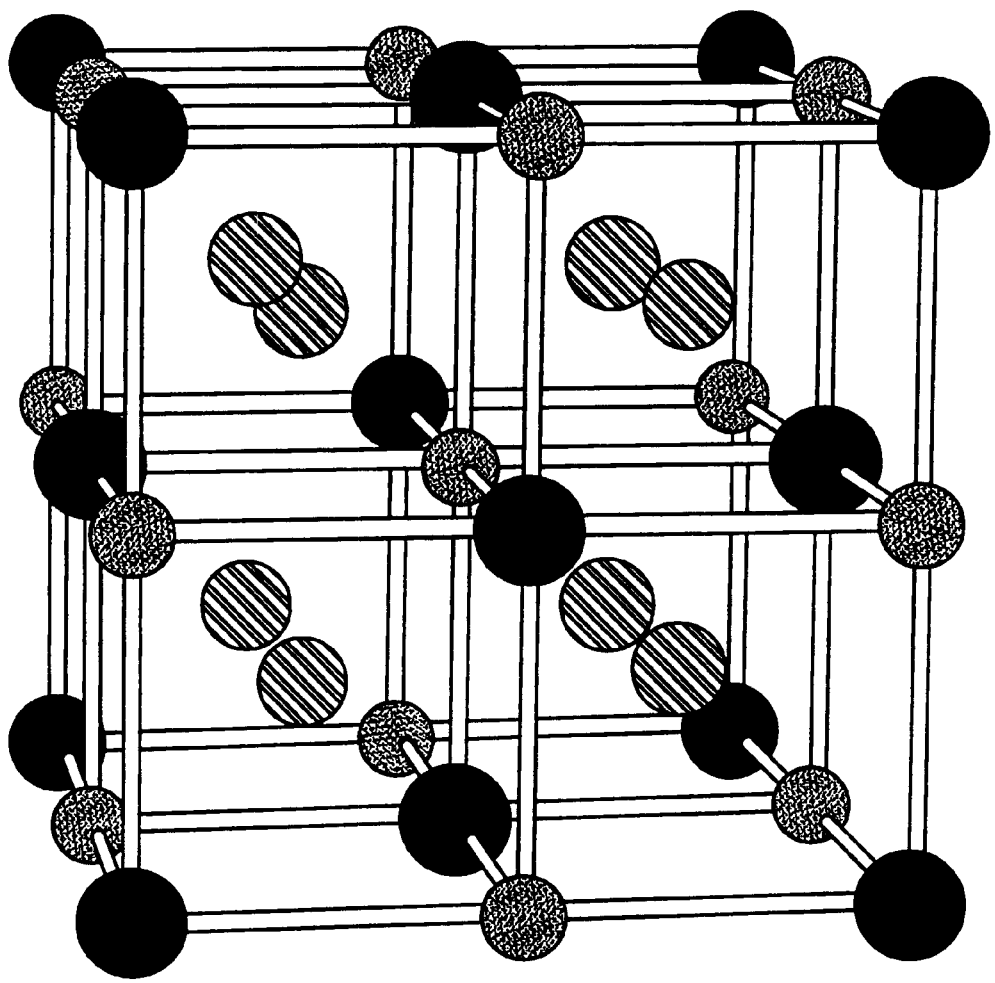
FIG. 8b is a representation of the disordered high-temperature structure of $Li_2CuSn$.

An important aspect of this invention is the discovery by combined electrochemical and in-situ X-ray diffraction studies of $Cu_6Sn_5$ electrodes in lithium cells, that lithium can be inserted topotactically into the $Cu_6Sn_5$ structure and that this process is reversible. It is believed, however, that the degree to which the lithium insertion reaction takes place is highly dependent on structural features of the intermetallic electrode, such as anti-site disorder and the reaction conditions under which the intermetallic electrodes are made. The X-ray diffraction data of various lithiated and delithiated samples (FIGS. 7a–d) showed that the lithiated phase $Li_xCu_6Sn_5$ (FIG. 7b) has an X-ray pattern similar to that of $Li_2CuSn$ (FIG. 7c). The structure of $Li_2CuSn$ has cubic symmetry. The room-temperature form of $Li_2CuSn$ (space group symmetry F-43 m), shown in FIG. 8a, is ordered. The Sn atoms and one-half of the Li atoms form two interlinked face-centered-cubic arrays. The Cu atoms and remaining Li atoms occupy interstitial sites located at the center of cubes defined by 4 Sn and 4 Li atoms of the face-centered-cubic arrays. The high-temperature phase of $Li_2CuSn$ has higher symmetry, Fm-3 m. In this case, the Li and Cu atoms within the cubes are randomly disordered, as shown in FIG. 8b to provide a Heusler-type phase, such as $Ni_2MnGa$, in which the Ni atoms occupy the same sites as the disordered Li and Cu atoms in FIG. 8b, and the Mn and Ga atoms occupy the sites of the Sn and remaining Li atoms, respectively.

Figure 8C:
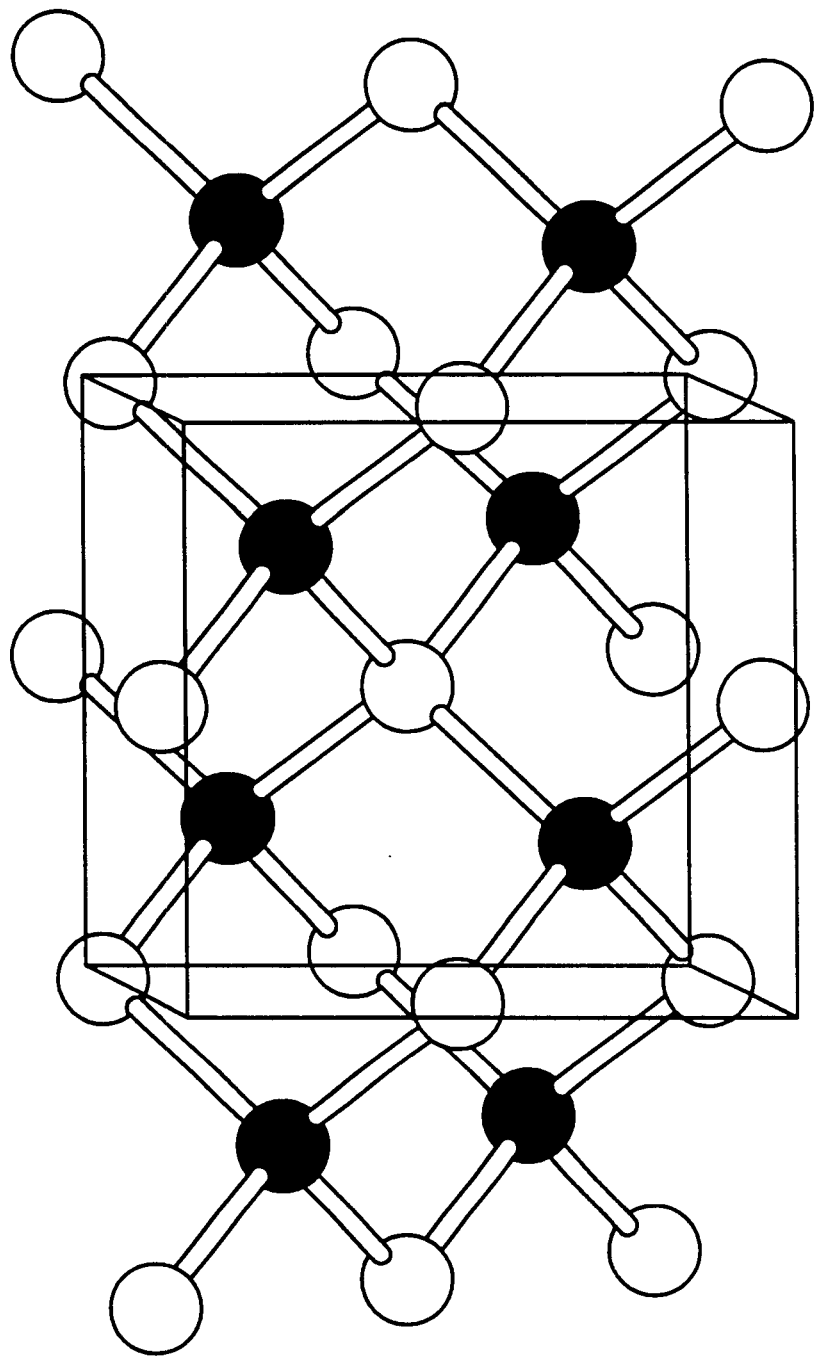

Of particular note is that the CuSn framework of the ordered $Li_2CuSn$ structure (FIG. 8a) has a zinc-blende-type lattice, as shown in FIG. 8c. Therefore, $Li_2CuSn$ may be regarded as having a lithiated zinc-blende-type structure in which the Li atoms occupy the interstitial sites of the CuSn host framework. The invention thus includes zinc-blendetype framework structures as insertion electrodes for lithium batteries. Other examples of such a zinc-blendetype framework structure is provided by the AgSn component in $Li_2AgSn$ and by the MgSi component in $Li_2MgSi$. Additional examples of zinc-blende-type structures are AlSb, GaSb, and InSb. Of particular significance is that by using the zinc-blende framework for an insertion electrode, it is possible to tailor the operating voltage of a lithium cell by changing the metal atoms in the framework.

Figure 9:
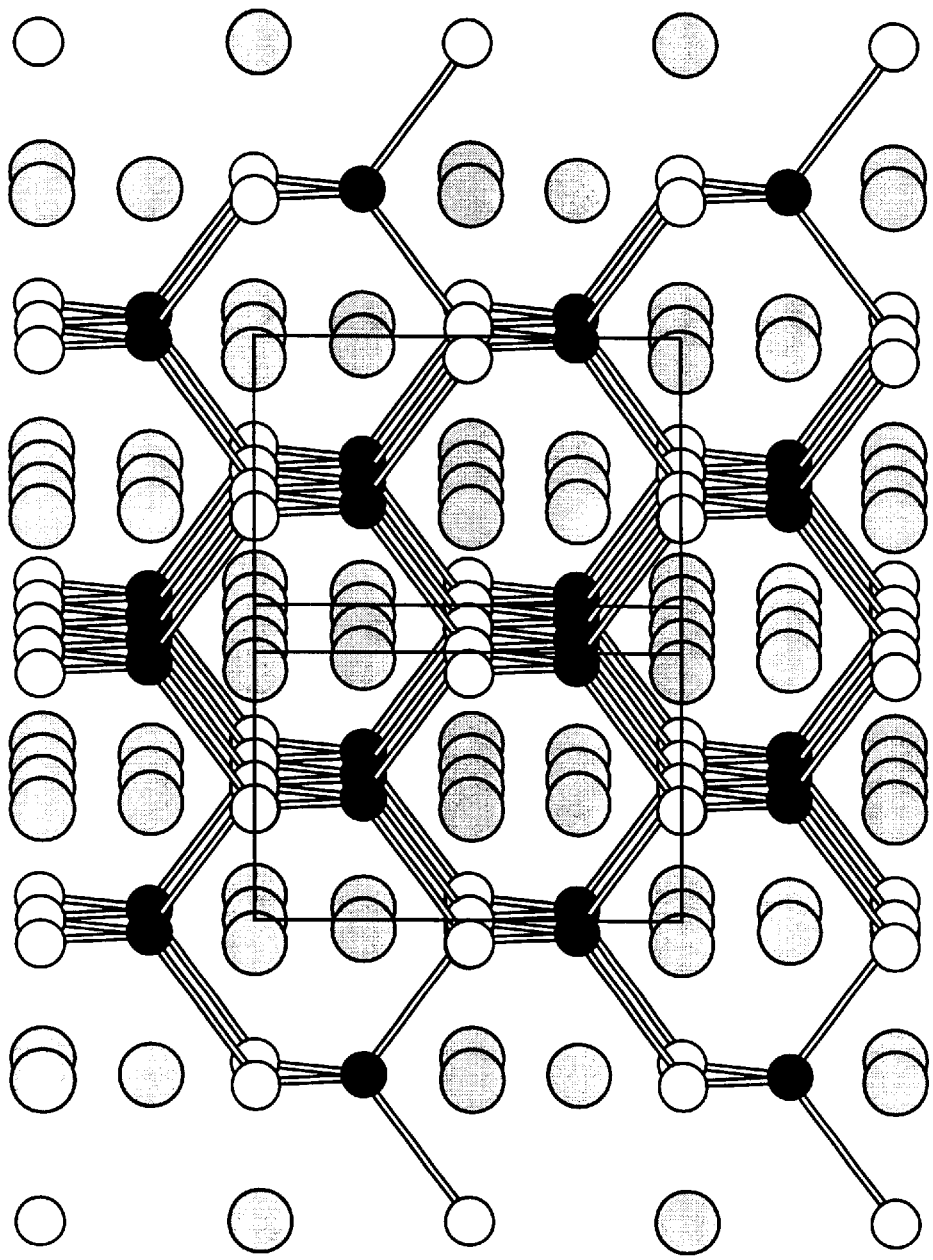
Figure 10:
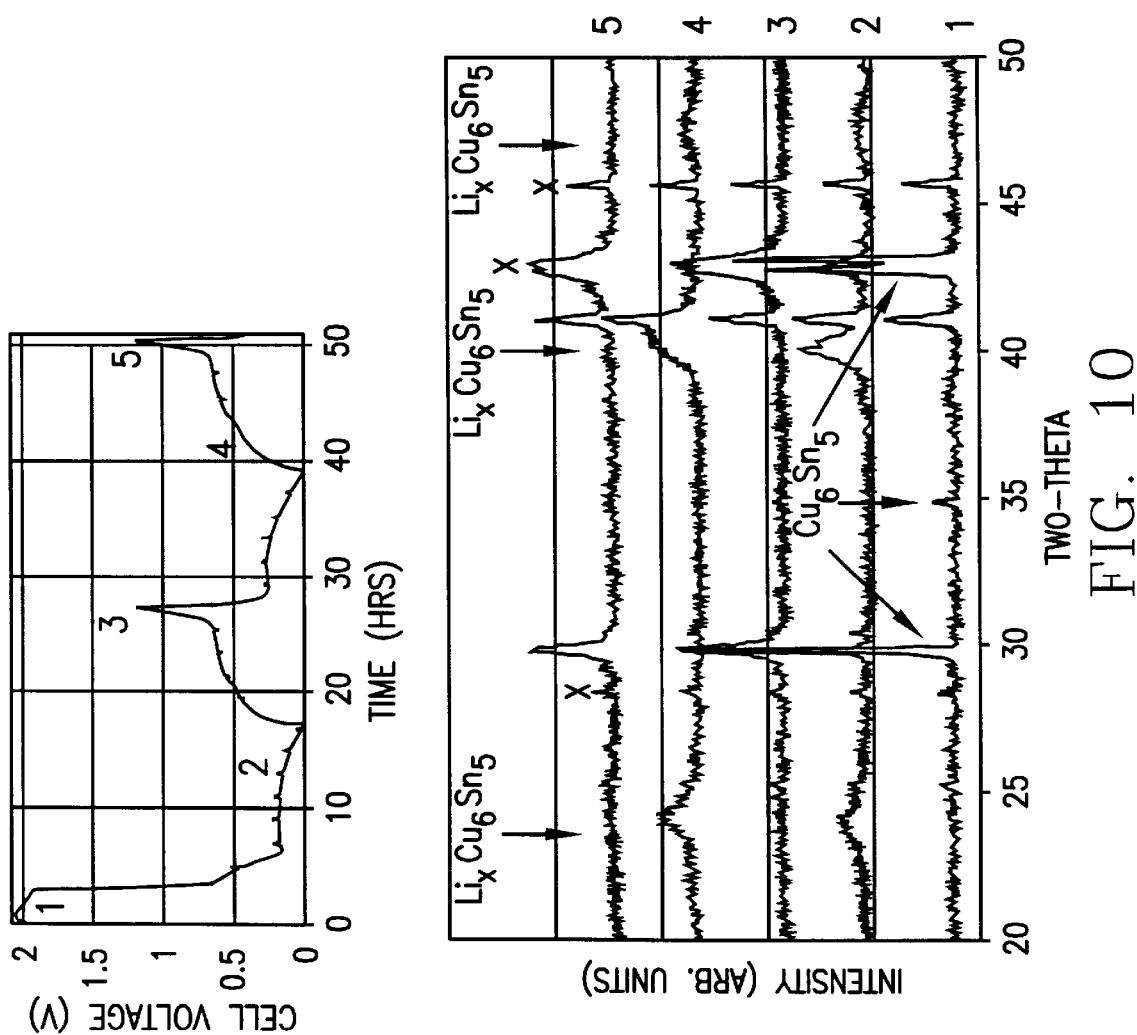
FIG. 10 shows the in-situ X-ray diffraction data (CuK radiation) of a $Li/Li_xCu_6Sn_5$ cell.

The ordered $Li_2CuSn$ structure, as depicted in a second representation of the structure in FIG. 9, bears a close relationship to the $\eta'$-$Cu_6Sn_5$ structure (FIG. 5a); this relationship, which is seen in the arrangement of the hexagonal columns, makes it easy to understand the topotactic reaction when lithium is inserted electrochemically into $\eta$-$Cu_6Sn_5$. It is apparent from the X-ray diffraction data in FIG. 10 obtained in-situ in an electrochemical cell that the lithiation process involves a two-phase reaction. The phase transformation from $\eta$-$Cu_6Sn_5$ to the $Li_2CuSn$-type structure can be understood if lithium insertion into the hexagonal columns of $\eta$-$Cu_6Sn_5$ displaces the Sn atoms from the center of the columns into the trigonal bipyramidal interstitial sites in neighboring Sn strings, as shown by the arrows in FIG. 5a. [Note that fall lithiation of $\eta$-$Cu_6Sn_5$ with an ideal defect NiAs-type structure would result in the composition $Li_{13}Cu_6Sn_5$ (alternatively, $Li_{2.17}CuSn_{0.83}$ or $Li_2Cu\{Sn_{0.83}Li_{0.17}\}$), in which 17% of the Sn sites are occupied by Li.] Such a reaction makes the hexagonal channels (5.6–6.2 Å in diameter) accessible for lithium occupation and creates two interstitial sites per hexagon for the incoming Li atoms (FIG. 9). However, to accommodate the inserted Li atoms, the layers of Cu and Sn atoms shear from their hexagonal-close-packed sequence ABACABAC in the $\eta$-$Cu_6Sn_5$ structure to the cubic-close-packed sequence ABCABC of like atoms in the $Li_2CuSn$-type structure.

During the transformation from $\eta$-$Cu_6Sn_5$ to $Li_{13}Cu_6Sn_5$, all the Cu atoms and one-half of the Sn atoms remain in their original strings. Even though 50% of the Sn atoms are displaced during lithium insertion from one string to another during lithium insertion, the phase transition is topotactic, i.e., a transition in which a definite orientation relationship exists between the two phases and in which some structural reorganization is necessary. In this transformation, one-half of the tin atoms are displaced by approximately 2.7 Å from their trigonal prismatic sites in a two-phase reaction to form columns of tin with the other one-half of the tin atoms. Thus, during this reaction, the "inactive" copper subarray and one-half of the tin subarray of the structure remain spatially intact. In the lithiated product, each Sn atom and each Cu atom is coordinated tetrahedrally to neighboring Cu and Sn atoms, respectively, in a zinc-blende-type structure. This topotactic reaction is reversible. Lithium insertion into the room-temperature structure, $\eta'$-$Cu_6Sn_5$ (FIG. 5b), in which Cu atoms partially occupy 20% of the interstitial trigonal bipyramidal sites can occur by a similar reaction mechanism described for $\eta$-$Cu_6Sn_5$ above. However, in this case, in order to form a $Li_2CuSn$-type structure, the ideal phase transformation would necessitate the diffusion of Cu atoms in the Sn—Cu strings to interstitial sites in neighboring strings, as shown by the arrows in FIG. 5b. The transformation also necessitates that the Cu atoms diffuse from the Sn—Cu strings to partially occupy the Li sites of an ordered $Li_2CuSn$-type structure. It is expected, therefore, that the fully-lithiated $\eta'$-$Cu_6Sn_5$ structure would have the composition $Li_9Cu_6Sn_5$, and that the atom arrangement, in $Li_2CuSn$ notation, would be $(Li_{1.8}Cu_{0.2})CuSn$. Because there are less interstitial sites available in $\eta'$-$Cu_6Sn_5$ compared with $\eta$-$Cu_6Sn_5$, the theoretical gravimetric capacity of $\eta'$-$Cu_6Sn_5$ (248 mAh/g) is significantly less than that of $\eta$-$Cu_6Sn_5$ (358 mAh/g) (Table 1).

Without being bound by theory and by the terminology used to describe the processes by which lithium is inserted into the intermetallic host electrode structures of the invention, the applicants believe that because of the structural relationship between $\eta'$-$Cu_6Sn_5$ (FIG. 5b) and $Ni_2In$ (FIG. 4), lithium insertion into $\eta'$-$Cu_6Sn_5$ may initially occur by the occupation of the interstitial trigonal bi-pyramidal sites by lithium before the transformation to the zinc-blende-type structure. Thus, for $\eta'$-$Cu_6Sn_5$— related materials, including both $\eta$-$Cu_6Sn_5$ and $\eta'$-$Cu_6Sn_5$, the initial lithiated $Li_xCu_6Sn_5$ products can be lithiated to a NiAs-type structure before converting to a lithiated zinc-blende-type structure. The invention is thus extended to incorporate such lithiated NiAs-type structures.

Thus, the discovery of the lithium insertion reaction into $Cu_6Sn_5$ has immediate important implications for the development of a new family of intermetallic electrodes with the $Cu_6Sn_5$ and $Li_2CuSn$ structure types. The invention therefore extends to include the family of compounds having structures related to the NiAs, $Ni_2In$, $Cu_6Sn_5$ and $Li_2CuSn$ structure types shown in FIGS. 3, 4, 5a, 5b, 8a, 8b and 8c.

For example, the $Ni_3Sn_2$ (and $Co_3Sn_2$) structure shown in FIG. 6 is remarkably similar to that of $\eta'$-$Cu_6Sn_5$ (FIG. 5b), having strings of Ni, and strings of Sn—Ni arranged in identical fashion to the strings of Cu and Sn—Cu in $\eta'$-$Cu_6Sn_5$. The difference between $Ni_3Sn_2$ ($Co_3Sn_2$) and $\eta'$-$Cu_6Sn_5$ structures is only in the number of interstitial trigonal bipyramidal sites occupied by the Ni (Co) and Cu atoms, respectively, in the Sn strings. For example, in $Ni_3Sn_2$, 50% of the interstitial trigonal bipyramidal sites are occupied by Ni, in contrast to the 20% occupation by Cu in $\eta'$-$Cu_6Sn_5$. Therefore, using the analogy to $\eta'$-$Cu_6Sn_5$, $Ni_3Sn_2$ may, in principle, accommodate lithium to the composition $Li_3Ni_3Sn_2$, or in $Li_2CuSn$ notation, to the composition $(Li_{1.5}Ni_{0.5})NiSn$; it offers a lower gravimetric capacity (195 mAh/g) and volumetric capacity (1755 mAh/mi) compared to $\eta'$-$Cu_6Sn_5$ and $\eta$-$Cu_6Sn_5$ (Table 1). Because of the high number of Ni atoms that must be accommodated in the Li sites of $Li_3Ni_3Sn_2$, it is anticipated that the phase transition should be more difficult to accomplish in $Li_xNi_3Sn_2$ electrodes compared to $Cu_6Sn_5$ electrodes. This hypothesis is supported by electrochemical data from nickel-tin electrodes that are inferior to the data derived from the analogous coppertin materials. With this structural argument, electrode materials of this invention that are close to the ideal NiAs composition and structure are expected to perform better than those electrodes close to the $Ni_2In$ composition and structure.

Figure 19:
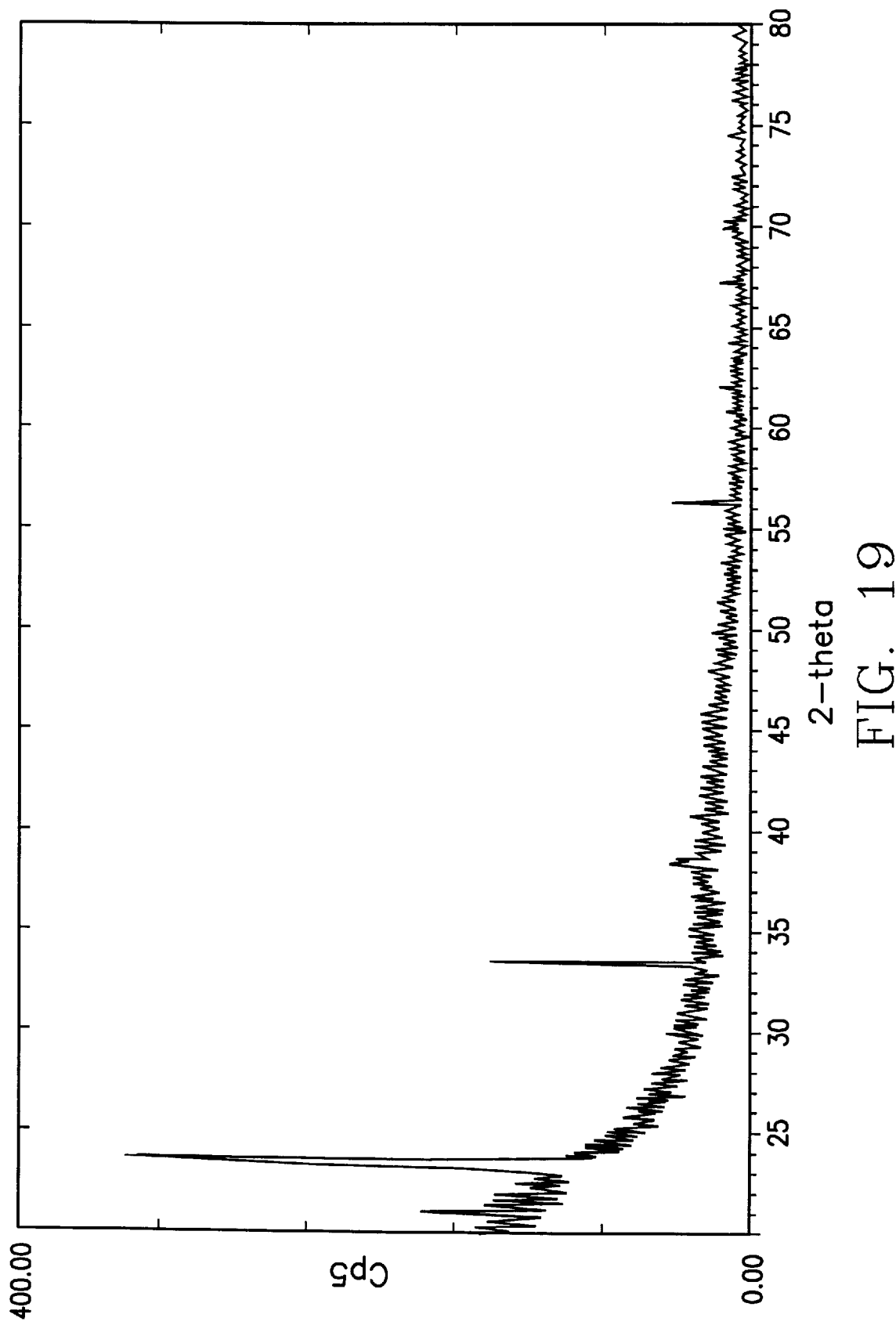
FIG. 19 shows the X-ray diffraction pattern (CuK radiation) of a $Li_2AgSn$ sample at room-temperature.

In a further embodiment of the invention, Table 2 illustrates the wide variety of compounds that can exist with the $Li_2CuSn$ structure. The hexagonally shaped channels in $Li_2CuSn$-type structures accommodate the inserted lithium. A particular embodiment of the invention therefore includes those isostructural materials in which non-lithium metals, M, occupy the Cu and Sn atom sites of $Li_2CuSn$ shown in FIG. 8a. One such example is $Li_2AgSn$, the X-ray diffraction pattern of which is shown in FIG. 19. Another particularly attractive example is $Li_2MgSi$ because Mg and Si are relatively light and inexpensive materials. The invention also includes those structures in which at least some M sites are occupied by Li. This is believed to occur in $Li_xCu_6Sn_5$ electrodes. For example, $Cu_6Sn_5$ can be represented $CuSn_{0.83}\square_{0.17}$ where $\square$ refers to a vacancy. On lithiation, therefore, the ideal Li$_2$CuSn-type structure is reached at the composition Li$_2$Cu(Sn$_{0.83}$Li$_{0.17}$), or alternatively Li$_{2.17}$CuSn$_{0.83}$, or alternatively Li$_{13}$Cu$_6$Sn$_5$. In this instance, 17% of the Sn sites are occupied by Li. The reaction of Cu$_6$Sn$_5$ with lithium to form Li$_{13}$Cu$_6$Sn$_5$ provides an electrode with a theoretical gravimetric capacity and a theoretical volumetric capacities of 358 mAh/g and 2506 mAh/ml, respectively, compared to the theoretical capacities of graphite, viz., 372 mAh/g and 818 mAh/ml (Table 1). A particular advantage of Cu$_6$Sn$_5$-type electrodes, therefore, is that they offer a significantly enhanced volumetric capacity to carbon.

It has been demonstrated that it is possible to extract the lithium from the Li$_2$CuSn structure, both chemically and electrochemically. Complete extraction of lithium would result in a copper-tin electrode with approximately the same CuSn ratio as in η-Cu$_6$Sn$_5$. Chemical extraction of lithium with NOBF$_4$ from Li$_2$CuSn results in a Cu$_6$Sn$_5$-type structure, as shown by the strong similarity between the room-temperature X-ray diffraction data of a chemically treated Li$_2$CuSn sample (FIG. 7d) and a standard Cu$_6$Sn$_5$ sample (FIG. 7a). These X-ray diffraction data clearly confirm the reversibility of the reaction

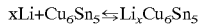

xLi+Cu$_6$Sn$_5$⇌Li$_x$Cu$_6$Sn$_5$

In the high-temperature structure of Li$_2$CuSn shown in FIG. 8b, the Cu atoms and one half of the Li atoms are disordered over the sites they normally occupy in the ideal, ordered structure at room-temperature (FIG. 8a). In practice, it is believed that at room temperature some disorder exists between these sites. This invention thus extends to include these disordered structures.

In MnO$_2$, the ratio of inactive element to active element is 2:1 which is approximately twice the ratio in Cu$_6$Sn$_5$ (1.2:1). Therefore, it is believed that increasing the inactive copper content as a separate Cu phase in the intermetallic electrode would provide greater cycling stability; conversely, increasing the active tin content as a separate Sn phase probably would reduce the cycling stability of the intermetallic electrode.

Li/Cu$_6$Sn$_{5+δ}$ cells were evaluated with electrodes having δ values of −1 (Cu$_6$Sn$_4$, copper-rich), 0 (Cu$_6$Sn$_5$) and +1 (Cu$_6$Sn$_6$, tin-rich). The electrochemical behavior of a standard Li/Sn cell was determined, for comparison. The electrochemical profiles of the first two discharge—and subsequent charge cycles of a Li/Sn cell and LiCu$_6$Sn$_{5+δ}$ cells (δ=0,±1) charged and discharged between 1.2 and 0.0 V are shown in FIGS. 11–14. All cells show an initial steep drop in voltage followed by a voltage plateau during discharge at approximately 400 mV; the latter process appears to correspond initially to the insertion of lithium into the Cu$_6$Sn$_5$ component and on subsequent cycling to the formation of at least some Li$_7$Sn$_3$ within a copper matrix. It is believed that reaction beyond the Li$_7$Sn$_3$ composition, i.e., when the cell voltage decreases to 0 V, occurs with the successive formation of phases with increasing lithium content, Li$_5$Sn$_2$, Li$_7$Sn$_2$ and Li$_{22}$Sn$_5$, as reported for Li/Sn cells at 25° C., but within copper matrix. It can be seen from the current interrupts that occur every hour during discharge and charge that the impedance of each cell improves dramatically after the first discharge. This improvement in performance can be attributed to better contact between electrolyte and active material and improved particle to particle contact that occurs during the early "conditioning" of the cells.

Figure 15:
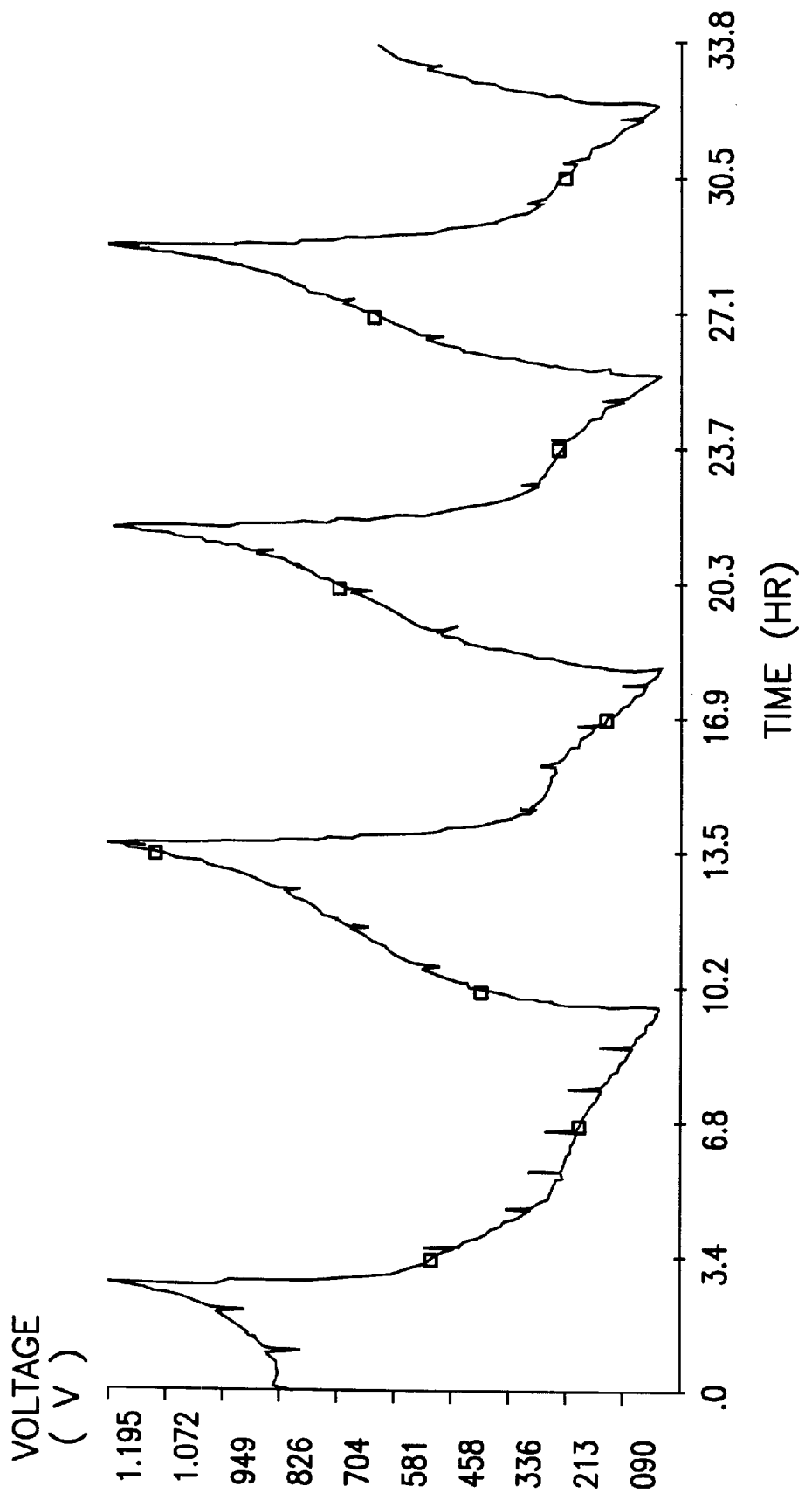
FIG. 15 is a graphical representation similar to FIG. 11 for a $Li/Li_2CuSn$ cell.

Electrochemical extraction from the intermetallic phase Li$_2$CuSn occurs with a steadily increasing voltage to the cut-off potential, 1.2 V (see FIG. 15). On the subsequent discharge, the electrode does not show the characteristic plateau at 400 mV, but rather shows a continuous decrease in voltage to 0V.

The relatively poor performance of Li$_2$CuSn electrodes compared to Cu$_6$Sn$_5$ electrodes observed in these initial tests is attributed to the high reactivity of the Li$_2$CuSn phase (particularly in moist air), and to the difficulty of assembling Li$_2$CuSn electrodes and cells without some degradation of the electrode. From this viewpoint, it is clearly advantageous to load cells with unlithiated electrodes, such as Cu$_6$Sn$_5$ rather than with Li$_2$CuSn electrodes.

The addition of copper to a tin electrode decreases the theoretical capacity of the tin electrode, whereas increasing the tin content increases the capacity, see Table 3; Table 3 gives the theoretical capacity of Li$_2$CuSn in terms of its ideal fully-delithiated composition CuSn; it has the same composition as Cu$_6$Sn$_6$ (δ=1). Complete removal of lithium from Li$_2$CuSn corresponds to a capacity of 273 mAh/g. Compared to the theoretical capacity of 372 mAh/g for LiC$_6$, the gravimetric capacity of the copper-tin electrodes, when lithiated to a 1:1 Li:Sn ratio is too small for it to be of practical interest for lithium-ion cells. However, for compositions reaching higher lithium content (for example, Li$_7$Sn$_3$ to Li$_{4.4}$Sn), the available capacity becomes more attractive, see Table 3. Note that in Li$_{13}$Cu$_6$Sn$_5$, which is believed to represent the maximum uptake of Li by the ideal η-Cu$_6$Sn$_5$, structure, the Li:Sn ratio is 2.6:1 which is close to that in Li$_7$Sn$_3$ (2.3:1). Because lithium-metal alloy systems have high crystallographic densities, they provide significantly higher volumetric capacities than lithiated carbon, LiC$_6$ (~750 mAh/ml). For example, Cu$_6$Sn$_5$ has a density of 8.28 g/ml; it will, therefore, provide a volumetric capacity of approximately 2450 mAh/ml when discharged to a Li$_7$Sn$_3$ composition (Li$_{11.67}$Cu$_6$Sn$_5$). A major advantage of these intermnetallic electrodes, therefore, is that they will occupy less volume than lithiated carbon electrodes for a given capacity value.

Figure 16:
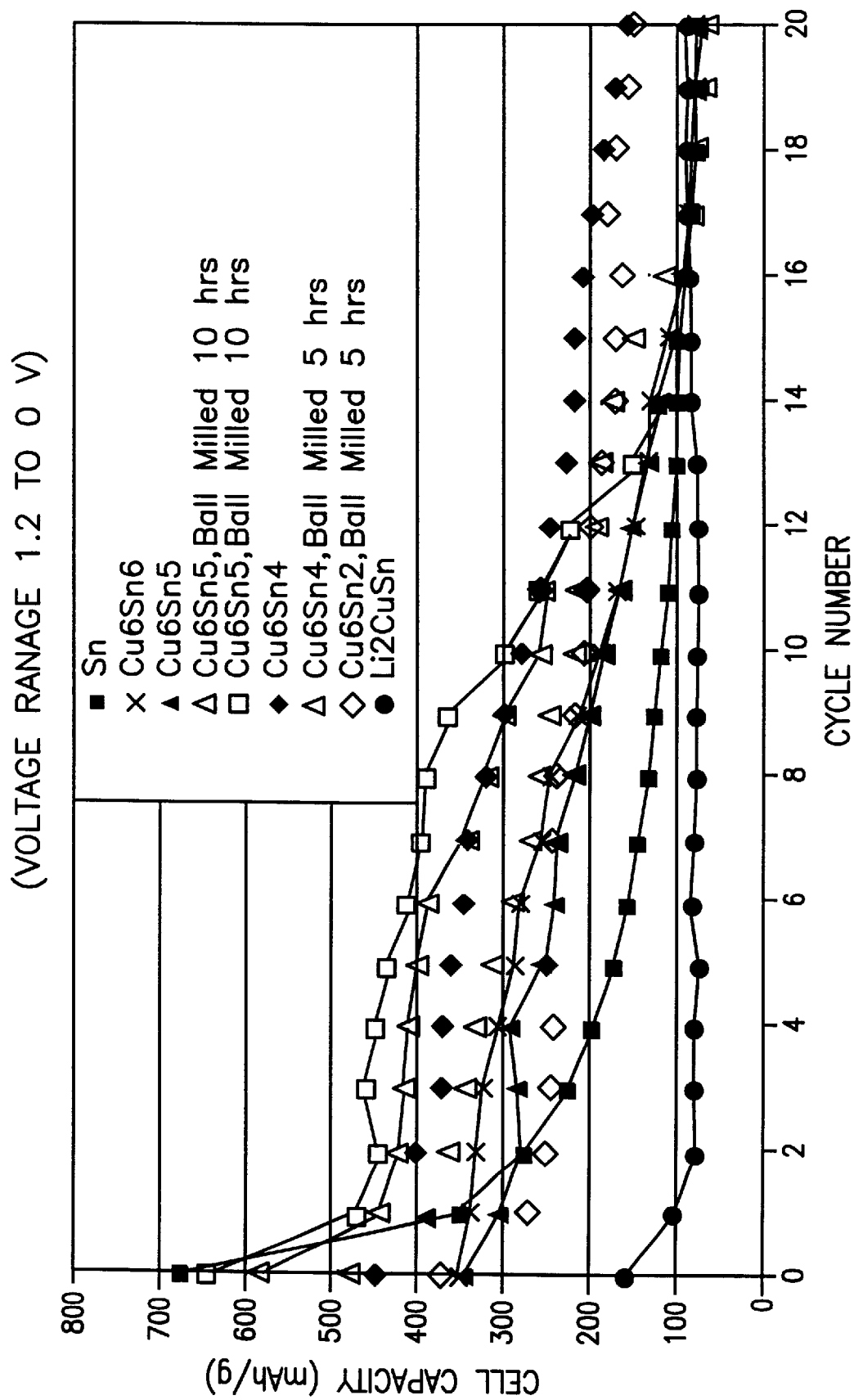
FIG. 16 is a graphical representation showing the relationship between cell capacity and the first twenty cycles for Li/Sn, $Li/Cu_6Sn_{5+\delta}$ (where $\delta=0,+1,-1,-3$) and $Li/Li_2CuSn$ cells cycled between 1.2 volts and 0.0 volts.

The capacity vs. cycle no. for Li/Sn and Li/Cu$_6$Sn$_{5+δ}$ (δ=0, +1, −1, −3) and Li/Li$_2$CuSn cells cycled over the range 1.2 to 0 V for the first 20 cycles is shown in FIG. 16. Although a pure tin electrode provides a significantly higher capacity on the initial discharge (~670 mAh/g) than copper-tin electrodes, the capacity of the pure tin electrodes decreases rapidly on cycling, dropping to ~115 mAh/g after 10 cycles. By contrast, the copper-tin electrodes Cu$_6$Sn$_{5+δ}$ (δ=0, +1, −1, −3) show lower capacity, but significantly better stability to electrochemical cycling. Cu$_6$Sn$_6$, Cu$_6$Sn$_5$, and Cu$_6$Sn$_4$ electrode powders that were not subjected to high-energy ball milling deliver 350,340 and 440 mAh/g on the initial discharge, and 180, 175 and 280 mAh/g after 10 cycles, respectively. The copper-rich electrodes Cu$_6$Sn$_4$ (δ=−1) and Cu$_6$Sn$_2$(δ=−3) show the greatest cycling stability after 20 cycles, in agreement with the hypothesis that higher concentrations of inactive component in composite copper-tin electrodes should enhance electrochemical recharge ability. Reducing the voltage window to 1.2 to 0.2 V improves the cycling stability of the copper-tin electrodes even further; in this case, excellent cycling stability is achieved but at the expense of some capacity. For example, over this voltage range, the Cu$_6$ Sn$_4$ electrode delivers an initial capacity of 165 mAh/g, which increases on cycling as the electrode is "conditioned"; it delivers a steady 190 mAh/g after 10 cycles, see FIG. 17. This extra stability is attributed to two major factors: 1) the reversible topotactic reaction of lithium into the Cu$_6$Sn$_5$ component, and 2) to the presence of an inactive, electronically copper component that serves to counter the deleterious volumetric expansion/contraction of any binary $Li_xSn$ alloys that might be formed during cycling, particularly towards the end of discharge when the lithium concentration at the copper-tin intermetallic surface exceeds the limit allowed by the topotactic lithium insertion reaction, i.e., in excess of the lithium content in $Li_{\sim13}Cu_6Sn_5$.

A further example of the stability of the intermetallic insertion electrodes of the present invention is given with respect to the compound InSb with a zinc-blende-type structure.

Figure 20:
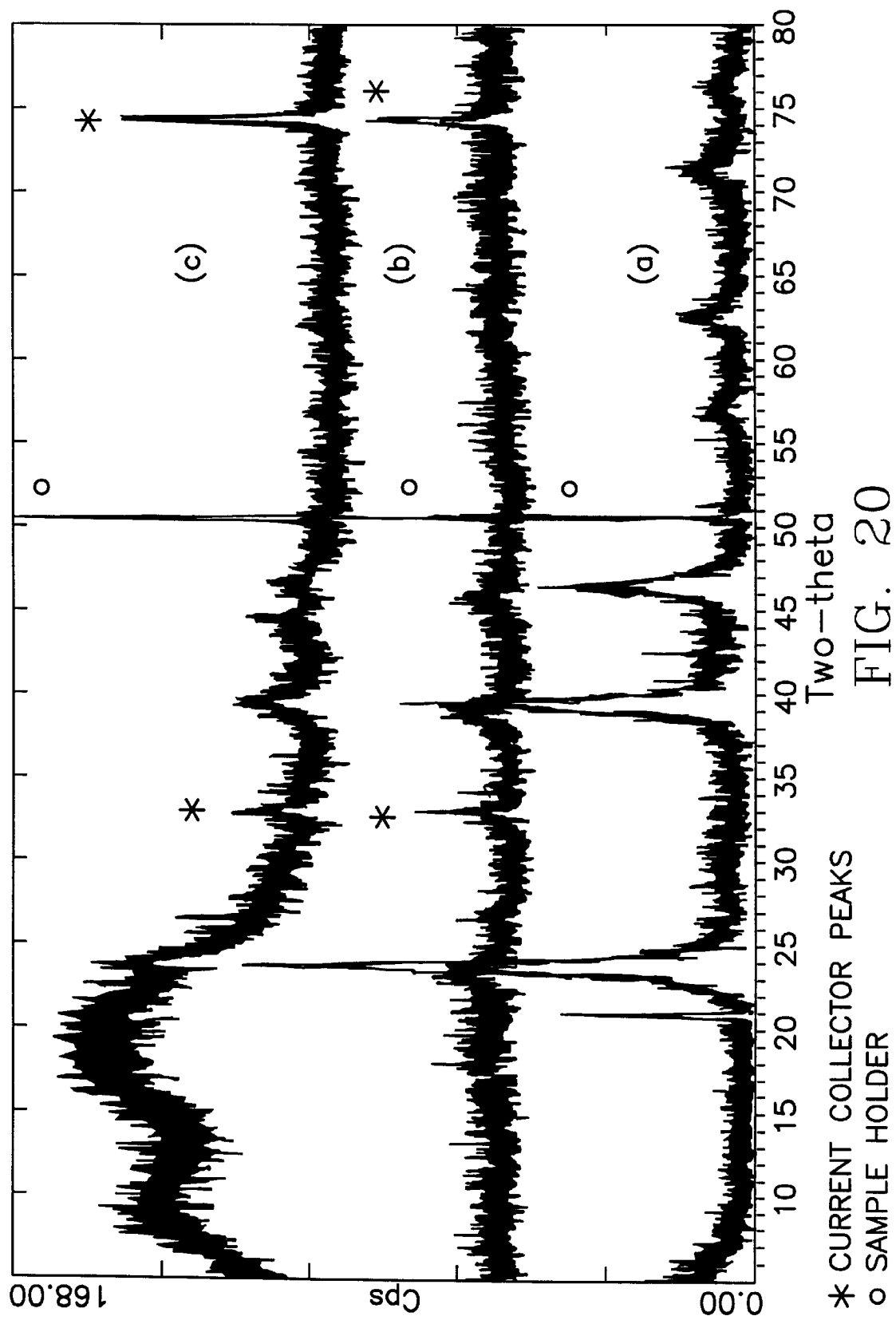
FIG. 20 shows the X-ray diffraction patterns (CuKα radiation) of (a) an InSb sample at room temperature, (b) a $Li_xInSb$ electrode lithiated to 0.5 V vs. $Li_x$ and (c) a cycled $Li_xInSb$ electrode after lithium extraction to 1.2 V vs. Li.

FIG. 20a shows the X-ray diffraction pattern of an initial InSb electrode having the zinc-blende-type structure. FIGS. 20b and 20c show the patterns of a $Li_xInSb$ electrode after the initial electrochemical lithiation of a Li/inSb cell to a 0.5 volt and subsequent delithiation reaction to 1.2 volt, respectively. The X-ray diffraction pattern of the $Li_xInSb$ electrode at 0.5 volt (FIG. 20b) resembles that of the parent InSb structure (FIG. 20a) but has a cubic lattice parameter 6.553 Å which is slightly larger than that of InSb (6.475 Å), as reflected by the slight shift of the peaks to lower two-theta values. This change in lattice parameter reflects only a small change in the cubic unit cell volume, namely, 3.66%. It is important to note that the X-ray diffraction pattern of the lithiated product in FIG. 20b also closely resembles that of $Li_3Sb$, because the idea structure of $LI_3Sb$ can be regarded as a lithiated $Li_2InSb$ structure in which the In atoms have been replaced by Li. This finding has important implications for designing zinc-blende-type intermetallic insertion electrodes that are tolerant to at least some over lithiation of the structure. Furthermore, it is clear from the X-ray diffraction pattern in FIG. 20c that the zinc-blende-type structure of InSb is regenerated after subsequent lithium extraction to 1.2 volt.

Figure 21:
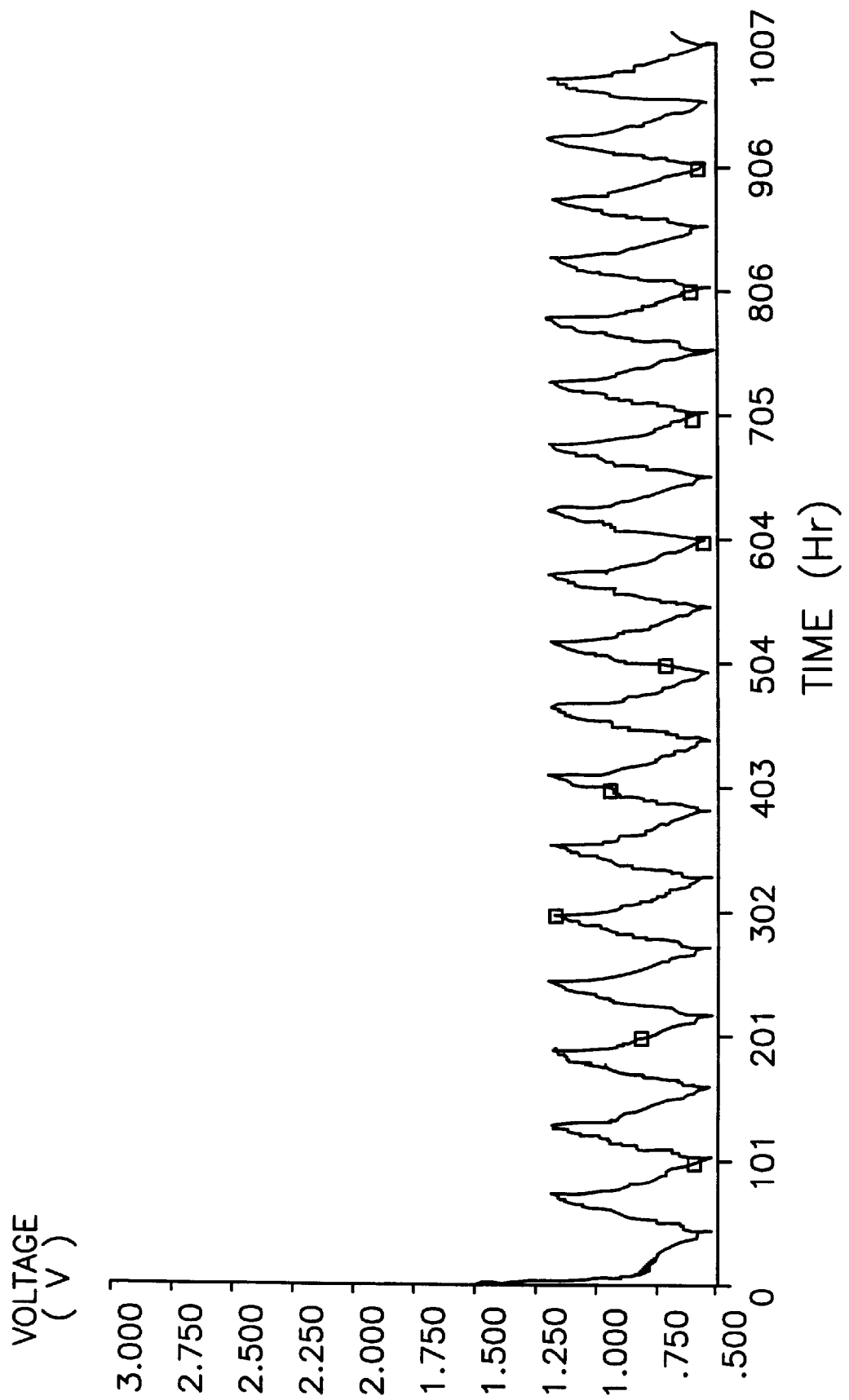
FIG. 21 is a graphical representation similar to FIG. 11 for the first 18 cycles of a Li/InSb cell cycled between 1.2 volts and 0.5 volts.
Figure 22:
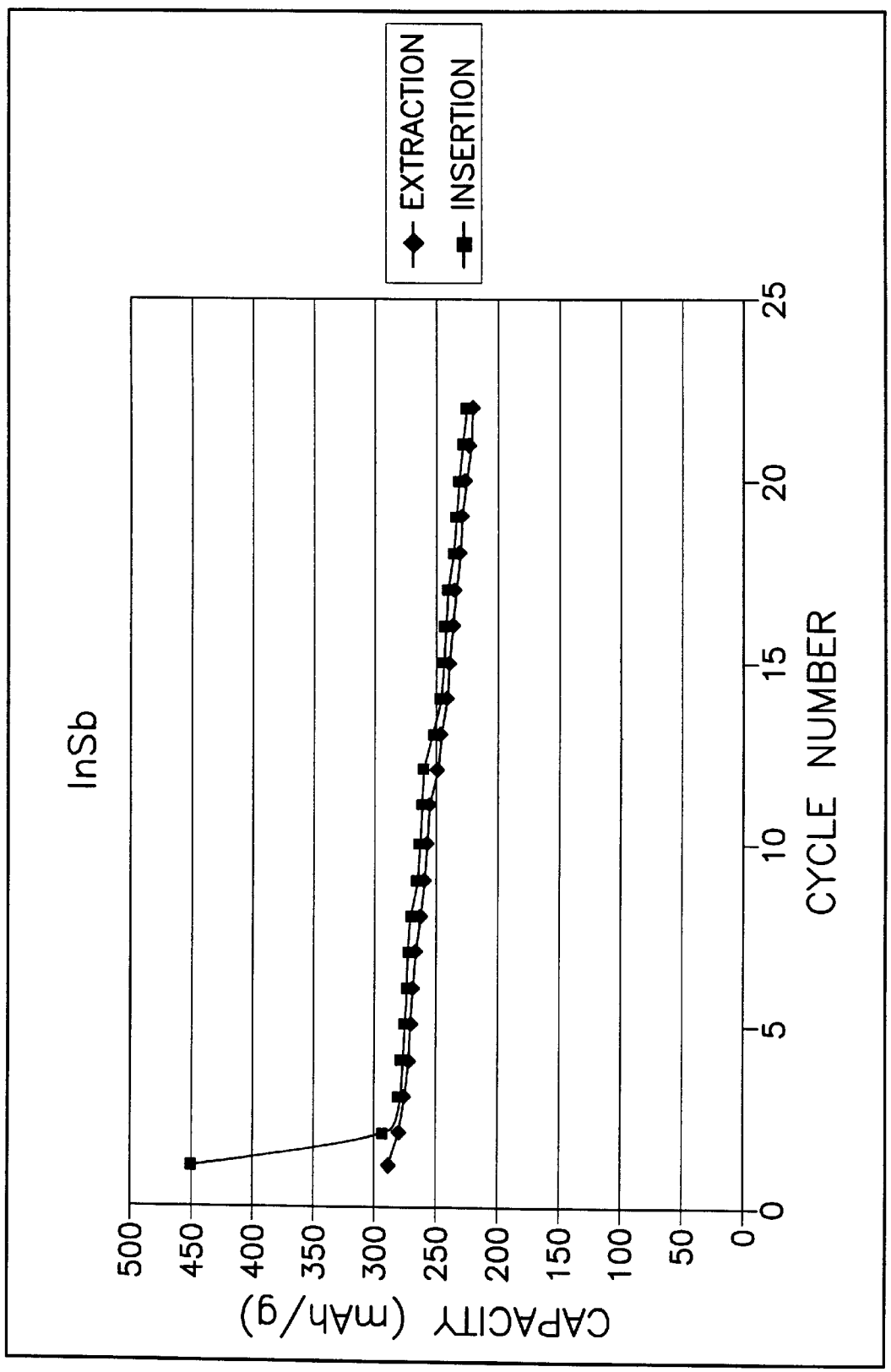
FIG. 22 is a graphical representation similar to FIG. 16 for the first 22 cycles of a Li/InSb cell cycled between 1.2 volts and 0.5 volts.

The voltage profiles of the first 18 cycles of a Li/InSb cell and the capacity vs. cycle number plot for the first 22 cycles are shown in FIGS. 21 and 22, respectively. It can be seen from FIGS. 21 and 22 that, apart from the first lithiation reaction, the electrochemical reaction is reversible when cells are cycled between 1.2 and 0.5 V. The exact reasons for the initial capacity loss on the first two cycles (450 to 290 mhAg, 64%) are unknown, although it can be speculated that this may be due to surface oxidation of the intermetallic electrode materials during processing. It is believed that this capacity loss can be reduced by improved processing techniques under inert conditions. Furthermore, in order to combat this capacity loss, the invention also includes intermetallic electrodes with additional lithium in the starting electrode, either as free lithium metal, or lithium as an integral part of the intermetallic electrode structure to compensate for any lithium that may be irreversibly locked within the negative intermetallic electrode during the initial lithiation reaction (charge) of the electrochemical cell.

Figure 23:
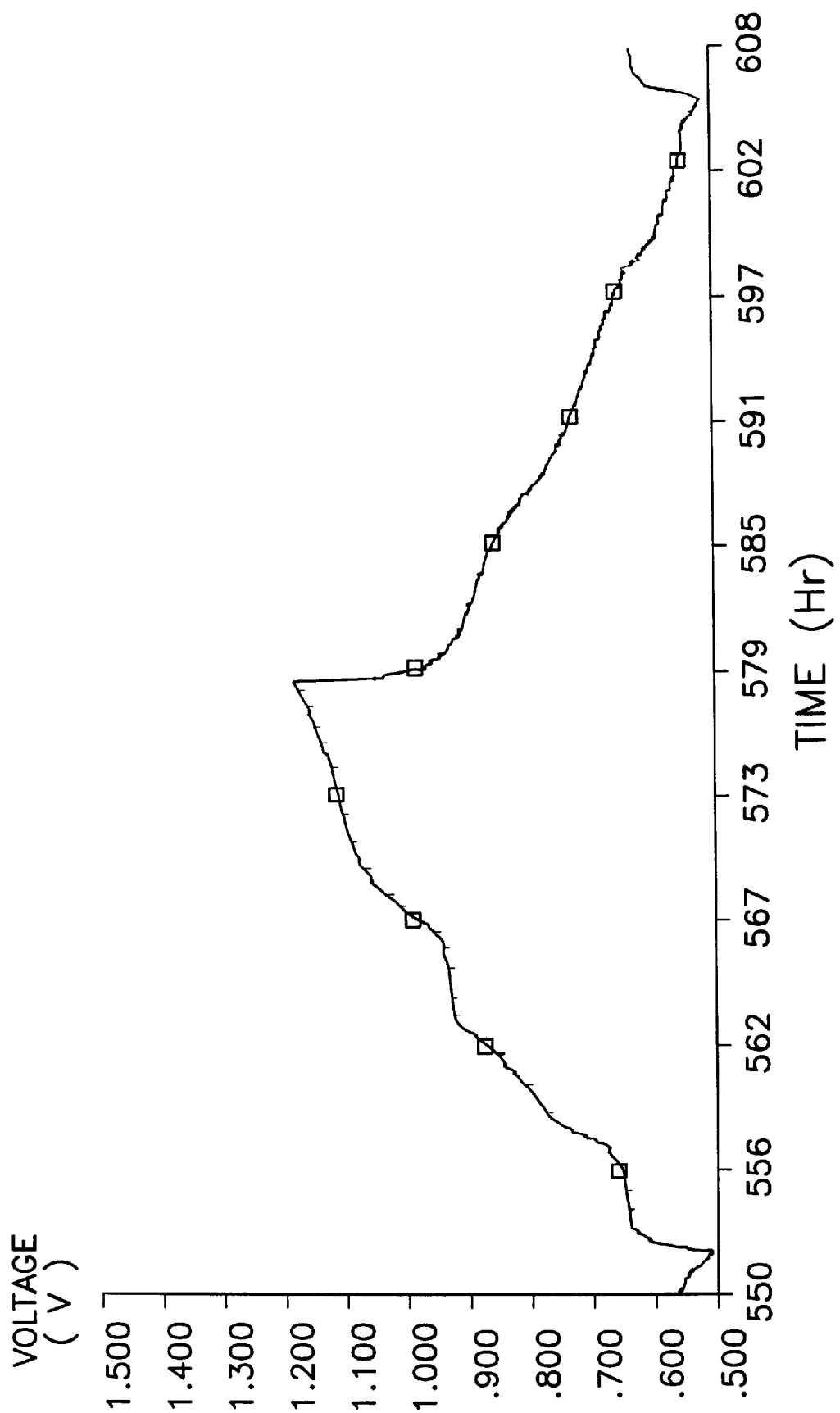
FIG. 23 is an expanded graphical representation similar to FIG. 21 for the $10^{th}$ cycle of a Li/InSb cell cycled between 1.2 volts and 0.5 volts.

Of particular significance to this invention is the typical profile of the Li/InSb cell shown in FIG. 23. The theoretical capacity of the InSb electrode, when lithiated to the fiiliy lithiated zinc-blende composition $Li_2InSb$, is 229 mAh/g. Lithium insertion into InSb to form $Li_2InSb$ is consistent with the two-stage reaction process that occurs between approximately 900 mV and 650 mV vs. Li in the expanded plot of cycle 10 in FIG. 24 because the two lithium atoms in the $Li_2InSb$ are located in two crystallographically independent positions and hence have different site energies. Therefore, the data in FIGS. 21, 22 and 23, that show a reversible capacity between 290 and 250 mAh/g during at least the first twelve cycles, imply that InSb can be lithiated beyond the fially lithiated zinc-blende composition without severely damaging the reversibility of the cell or the InSb zinc-blende structure that is generated after delithiation of the electrode at 1.2 volts vs. Li. Although the reasons for this excellent and surprising behavior have not precisely been determined, the X-ray diffraction data in FIGS. 20a, b and c suggests that further lithiation of $Li_2InSb$ results in $Li_3Sb$-type structure which has a strong crystallographic relationship to both InSb and $Li_2InSb$-type structures. Such a reaction, which is believed to occur as a displacement reaction, can be represented (for complete reaction with lithium):

Because of the strong resemblance of the X-ray diffraction pattern in FIG. 20b in $Li_3Sb$, it is believed that the value of x in the reaction above is close or equal to zero and that In is preferentially extruded from the lattice in very finely divided form; the In can be reincorporated into the structure on reversing the direction of the current. The fact that all components of this system remain metallic or semiconducting at all states of charge and discharge is believed to contribute towards the good reversibility of the reaction, as well as the strong crystallographic relationship between the InSb, $Li_2InSb$ and $Li_3Sb$ intermetallic structures. The lithiation of InSb is analogous to that which occurs in some metal oxides at room temperature such as $Fe_3O_4$

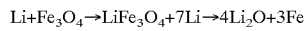

In contrast to the $Li_xInSb$ intermetallic system, the lithiation of $Fe_3O_4$ at room temperature is irreversible, because of the nature of the $Fe_3O_4$ (spinel) to rocksalt ($LiFe_3O_4$) transformation and the insulating properties of the fully discharged $Li_2O$ product. The overall reaction becomes more reversible at higher temperatures when iron can be more easily reincorporated back into the close-packed oxygen array to regenerate lithium-iron oxide spinel phases.

This invention is thus extended to include overlithiated intermetallic zinc-blende electrode structures, and particularly those with a $Li_3Sb$-type structure. Furthermore, an additional advantage of the $Li_3Sb$-type structure is that it can be used as an excellent end-of-charge indicator to signal full lithiation of the $Li_2InSb$-zinc-blende-type electrode structures.

Figure 24:
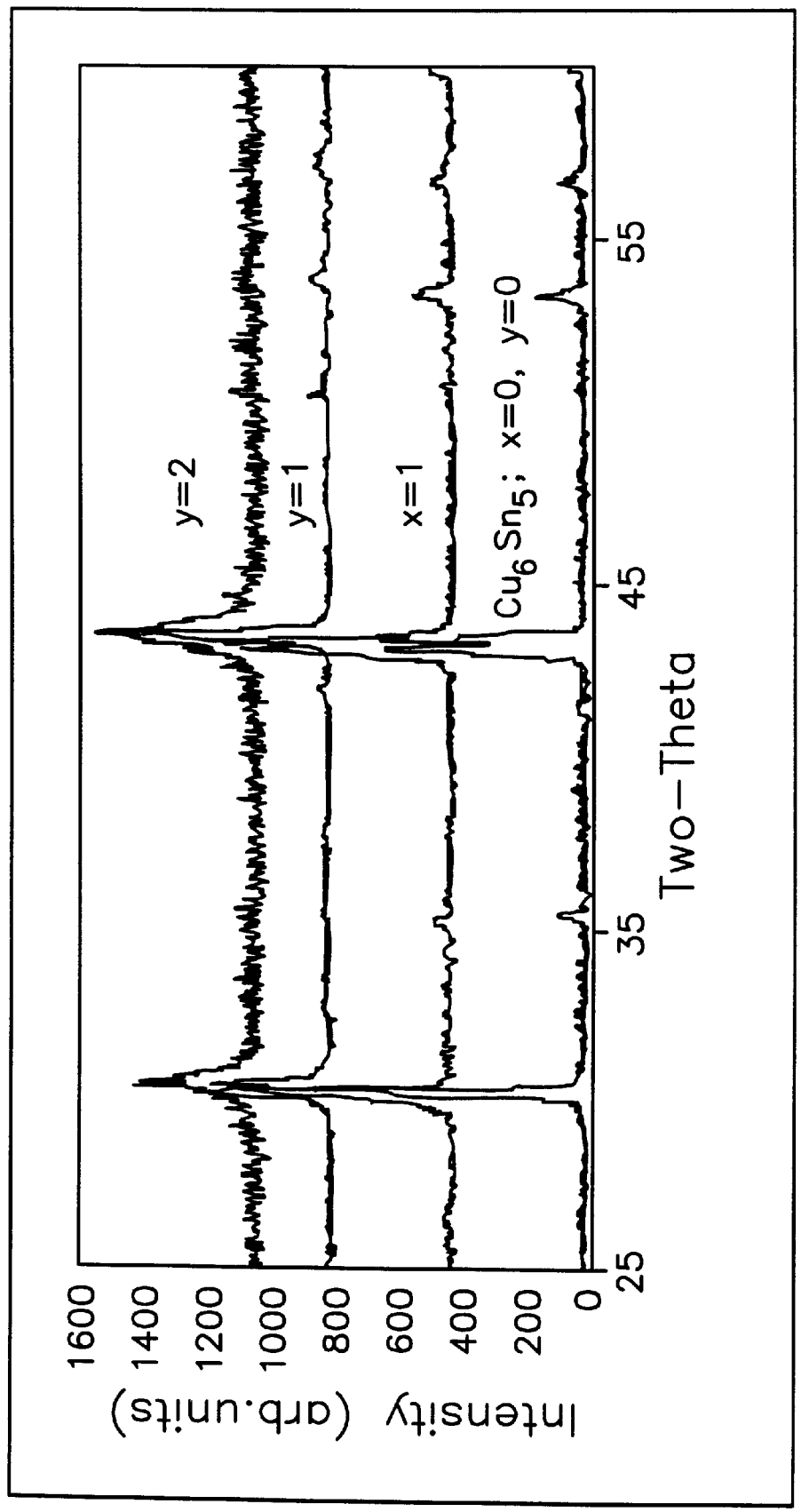
FIG. 24 shows the X-ray diffraction patterns (CuKα radiation) of a zinc-substituted $Cu_6Sn_5$ structure, $Cu_{6-x}Zn_xSn_5$, with x=1, and two nickel-substituted $Cu_6Sn_5$ structures, $Cu_{6-y}Ni_ySn_5$, with y=1 and 2.
Figure 25:
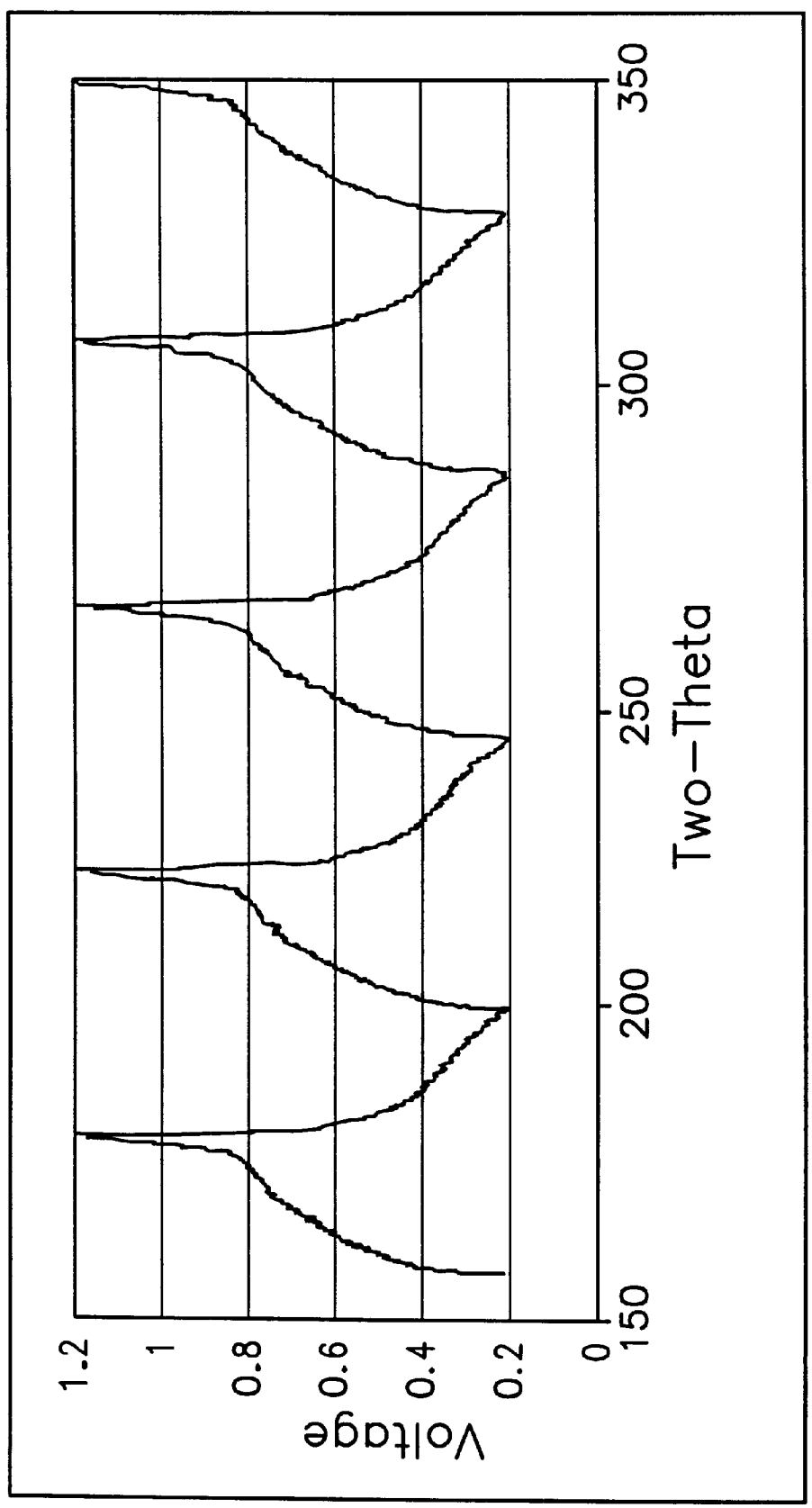
FIG. 25 is a graphical representation similar to FIG. 11 for 4 cycles of a $Li/Cu_{6-x}Zn_xSn_5$ (x=1) cell.
Figure 26:
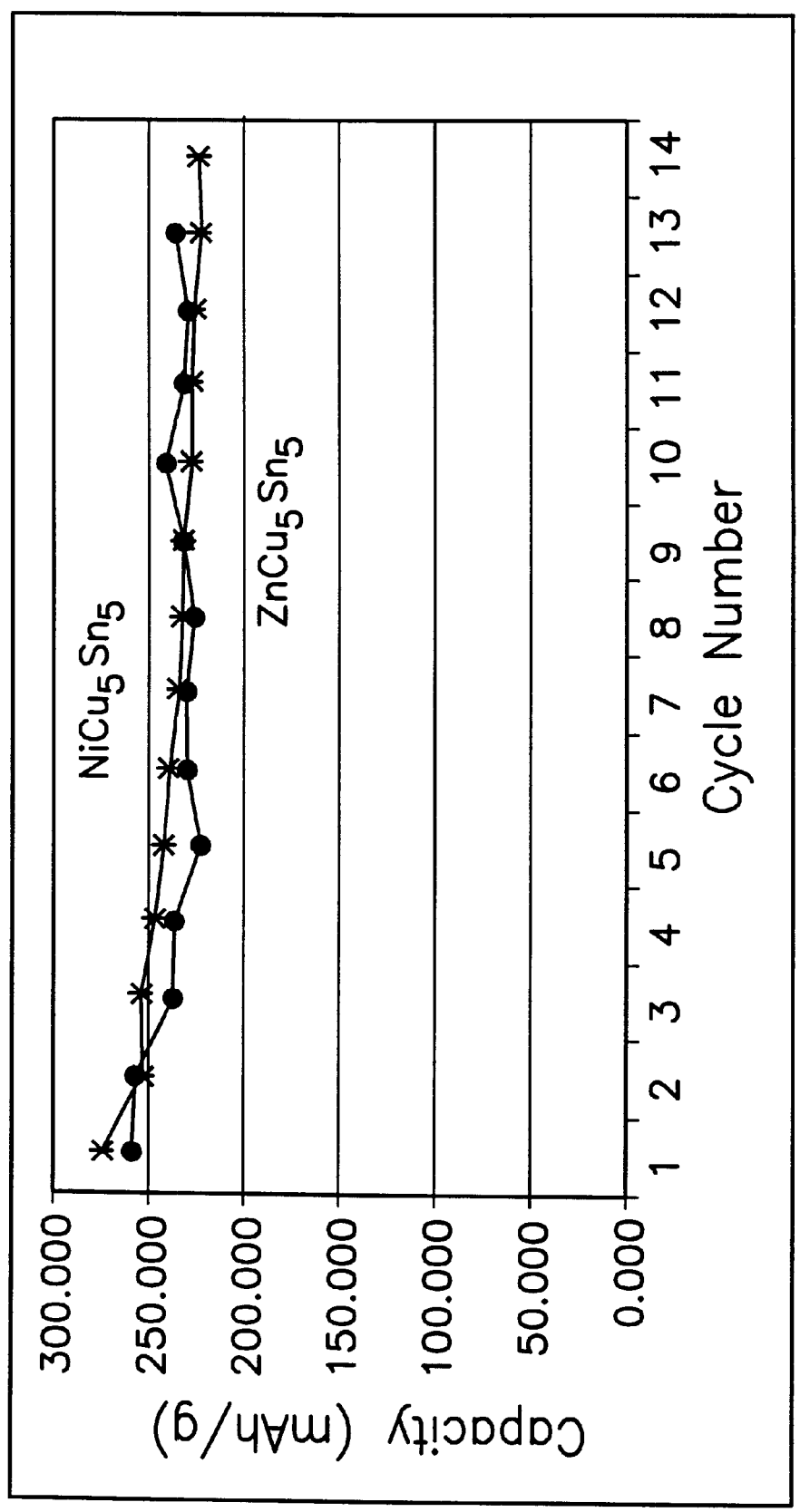
FIG. 26 is a graphical representation similar to FIG. 16 for the first 13 and 14 cycles of a $Li/Cu_{6-x}Zn_xSn_5$ (x=1) cell, and a $Li/Cu_{6-y}Ni_ySn_5$ (y–1), respectively, where the dot (·) is Zn, and the star (*) is Ni.

As further examples to illustrate the scope of the invention as previously described herein, the copper atoms of the $Cu_6Sn_5$ NiAs-type) structure were partially replaced by Zn or Ni atoms, thus increasing and reducing the number of valence electrons associated with the metal elements in the structure, respectively. For example, the compounds $Cu_{6-x}Zn_xSn_5$ and $Cu_{6-y}Ni_ySn_5$ with x=1 and y=1 and y=2 were prepared, the X-ray diffraction patterns of which are illustrated in FIG. 24 showed that they were isostructural with $Cu_6Sn_5$. These compounds showed enhanced electrochemical behavior to $Cu_6Sn_5$. For example, FIG. 25 shows the typical charge/discharge profiles for cycles 4 to 7 of a $Li/Cu_{6-x}Zn_xSn_5$ cell when cycled between 1.2 and 0.2 V. A plot of capacity vs. cycle life for a $Li/Cu_{6-x}Zn_xSn_5$ cell and a $Li/Cu_{6-y}Ni_ySn_5$ (y=1) cell is shown in FIG. 26 where the dot (·) is Zn, and the star (*) is Ni. These samples were prepared in the presence of 3–5 w/o (weight percent) carbon, thereby allowing for the substitution of carbon atom for some of the metal atoms. If other non-metals were substituted for carbon, then these non-metals would also substitute for some of the metal atoms.

Therefore, in a further embodiment of the invention, it stands to reason that selective substitution of metal atoms with other atoms in the intermetallic host structure, such as a NiAs-type structure, a NiIn-type structure and a zinc-blende type structure can be achieved without significantly altering their structures or seriously affecting the electrochemical performance of the electrode. Moreover, it is well known in the art that zinc-blende structures exist that are comprised of a metal atom and a non-metal atom, well known examples being the mineral zinc-blende itself, ZnS, and also AgO, GaP, and ZnSe, that contain the non-metal elements S, O, P and Se, respectively. Therefore, the invention also includes those intermetallic compounds defined above in which the metal atoms can be at least partially substituted by a non-metal element, the intermetallic compound preferably containing less than 50 atom percent of a non-metal element, more preferably less than 20 atom percent of a non-metal element, and most preferably less than 10 atom percent of a non-metal element, the non-metals being selected from one or more of B, C, N, O, F, P, S, Cl, As, Se, Br, Te and I.

This invention thus also embodies electrode intermetallic host structures that transform on lithiation to a lithiated zinc-blende-type structure in the presence of an additional substantially inactive (non-alloying) element (or elements) with respect to lithium, or alternatively, an additional substantially active alloying element (or elements) with respect to lithium, or both.

In this regard, the invention also encompasses the use of carbonaceous additives, such as graphite and pyrolyzed carbons, to the intermetallic negative electrode, thereby providing a composite electrode structure or composite matrix to improve the current collection around electronically disconnected particles. Additional advantages of carbonaceous additives are that they can also contribute to the overall electrochemical capacity of the negative electrode and to provide end-of-charge indicators to prevent over-lithiation of the intermetallic electrode materials.

EXPERIMENTAL

Example 1

$Cu_6Sn_5$ was synthesized by reacting metallic tin and metallic copper in stoichiometric amounts at 400° C. under argon for 12 hours. The sample was ground by mechanical milling to an average particle size of less than 10 microns. X-ray diffraction data, collected on a Siemens D5000 powder diffractometer with CuKα radiation showed that the $Cu_6Sn_5$ product was an essentially single-phase product as shown in FIG. 7a.

Example 2

Copper-rich and tin-rich materials $Cu_6Sn_{5+\delta}$ ($\delta=1, -3$), i.e., $Cu_6Sn_6$, $Cu_6Sn_4$, and $Cu_6Sn_2$ were prepared in identical fashion to $Cu_6Sn_5$ in Example 1 with the required excess/deficiency of copper. The samples were ground by mechanical milling to an average particle size of less than 10 microns. The copper-rich and tin-rich materials showed the characteristic peaks of $Cu_6Sn_5$ and additional peaks of copper and tin metal, respectively.

Example 3

$Li_2CuSn$ was prepared by heating lithium metal, copper metal and tin metal at 900° C. under argon for 3 hours. The sample was ground by mechanical milling to an average particle size of less than 40 microns. X-ray diffraction data, collected on a Siemens D5000 powder diffractometer with CuKα radiation showed that the $Li_2CuSn$ product was an essentially singlephase product as shown in FIG. 7c.

Example 4

$Li_2CuSn$ was chemically delithiated by reaction with $NOBF_4$ in acetonitrile at room temperature. X-ray diffraction data, collected on a Siemens D5000 powder diffractometer with CuKα radiation showed that the product was an essentially single-phase product with a $Cu_6Sn_5$-type structure as shown in FIG. 7d.

Example 5

Figure 18:
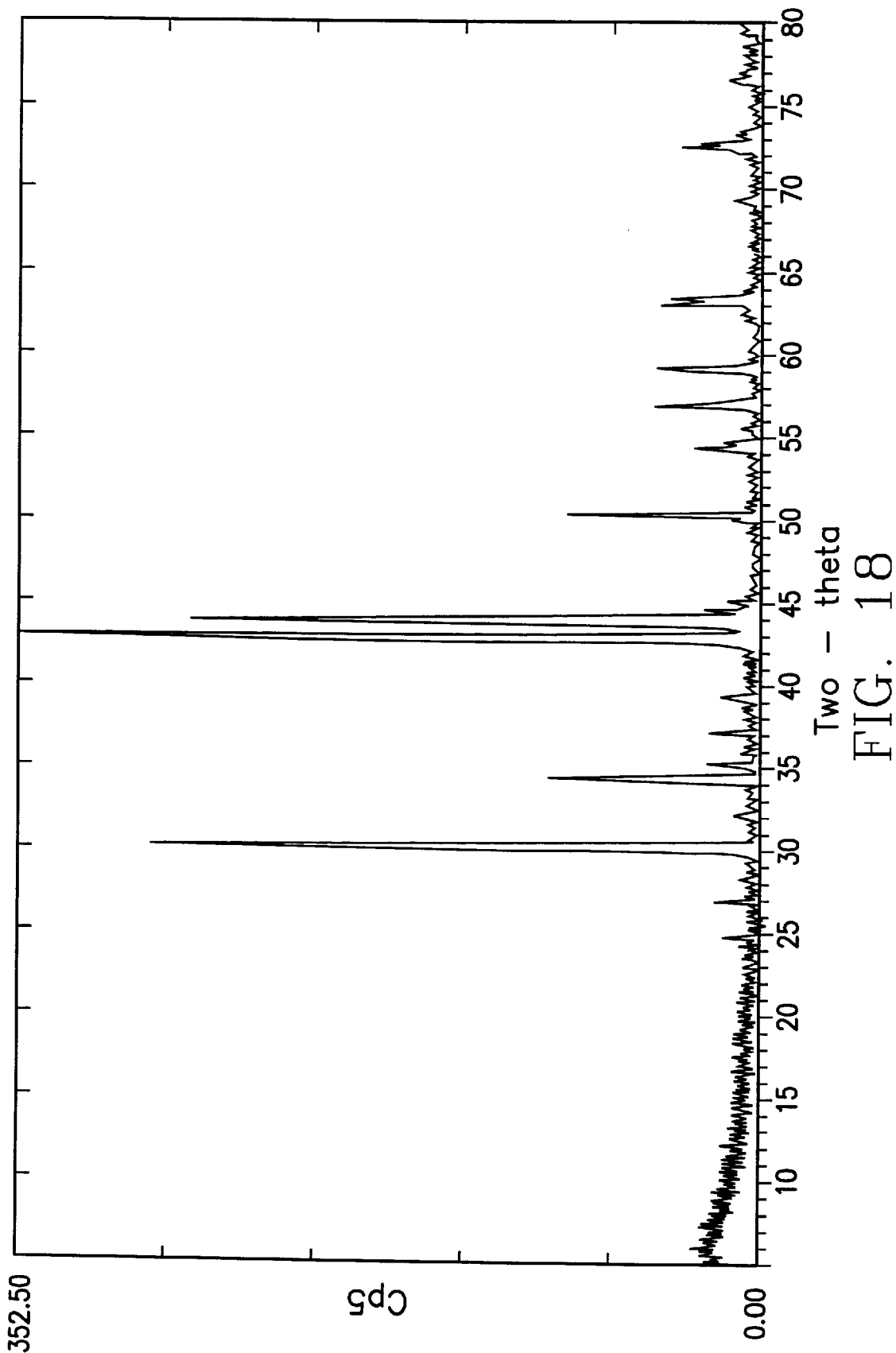
FIG. 18 shows the X-ray diffraction pattern (CuK radiation) of a $Ni_3Sn_2$ sample at room-temperature.

$Ni_3Sn_2$ was synthesized by reacting metallic tin and metallic nickel in stoichiometric amounts at 650° C. under argon for 12 hours. The sample was ground by mechanical milling to an average particle size of less than 40 microns. X-ray diffraction data, collected on a Siemens D5000 powder diffractometer with CuKα radiation showed that the $Ni_3Sn_2$ product was an essentially single-phase product as shown in FIG. 18.

Example 6

$Li_2AgSn$ was prepared by heating lithium metal; silver metal and tin metal at 900° C. under argon for 3 hours. The sample was ground by mechanical milling to an average particle size of less than 40 microns. X-ray diffraction data, collected on a Siemens D5000 powder diffractometer with CuKα radiation showed that the $Li_2AgSn$ product was an essentially single-phase product as shown in FIG. 19.

Example 7

InSb was prepared by ball-milling indium metal and antimony metal powder at room temperature in air for 20 hours. Thereafter, the sample was annealed under argon for 10 hours at 400° C., and subsequently ground to an average particle size of less than 40 microns. X-ray diffraction data, collected on a Siemens D5000 powder diffractometer with CuKα radiation showed that the InSb product was an essentially single-phase product as shown in FIG. 20a.

Example 8

Samples of $Cu_{6-x}Zn_xSn_5$ were prepared by ball milling Cu, Zn, and Sn in the appropriate stoichiometric ratios with values between $0<x<6$. For these samples, 3–5% weight percent (about 25 atom percent) carbon was added as a solid lubricant into the mixer. Samples were examined by powder XRD using a Siemens D5000 powder diffractometer with CuKα radiation. The samples were found to be single phase in the range of $(0<x<2)$. The X-ray pattern showing the single phase product $Cu_5ZnSn_5$ ($x=1$) is shown in FIG. 24.

Example 9

Samples of $Cu_{6-y}Ni_ySn_5$ were prepared by ball milling Cu, Ni and Sn in the appropriate stoichiometric ratios with values between $0<y<6$. For these samples, 3–5% weight percent (about 25 atom percent) carbon was added as a solid lubricant into the mixer. Samples were examined by powder XRD using a Siemens D5000 powder diffractometer with CuKα radiation. The samples were found to be single phase in the range of $(0<y<3)$. The X-ray patterns showing the single phase products $Cu_5NiSn_5$ ($y=1$) and $Cu_4Ni_2Sn_5$ ($y=2$) are shown in FIG. 24.

Example 10

Figure 11:
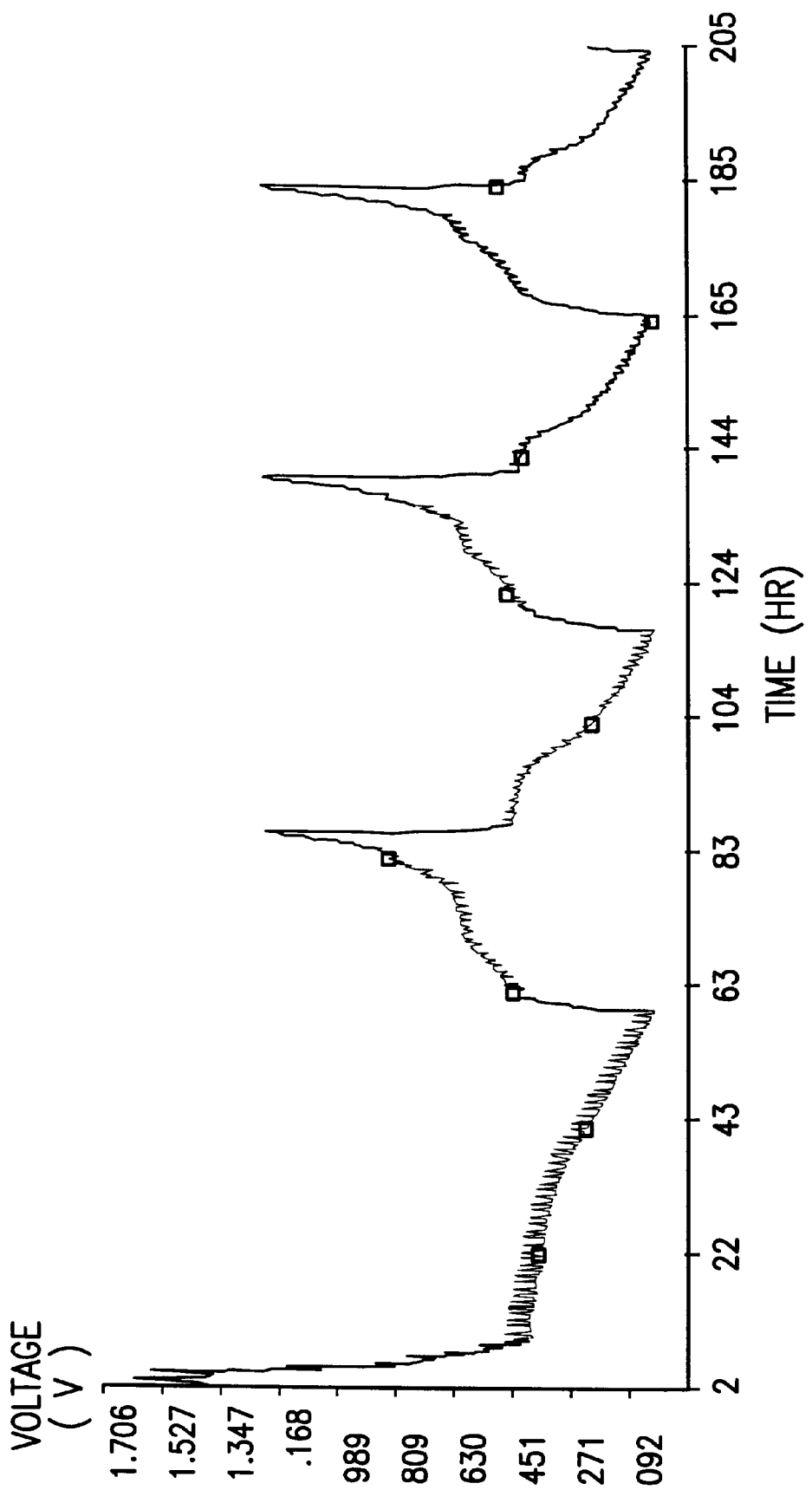
FIG. 11 is an electrochemical profile of the first four discharge and three charge cycles of a Li/Sn cell between 1.2 volts and 0.0 volts.
Figure 12:
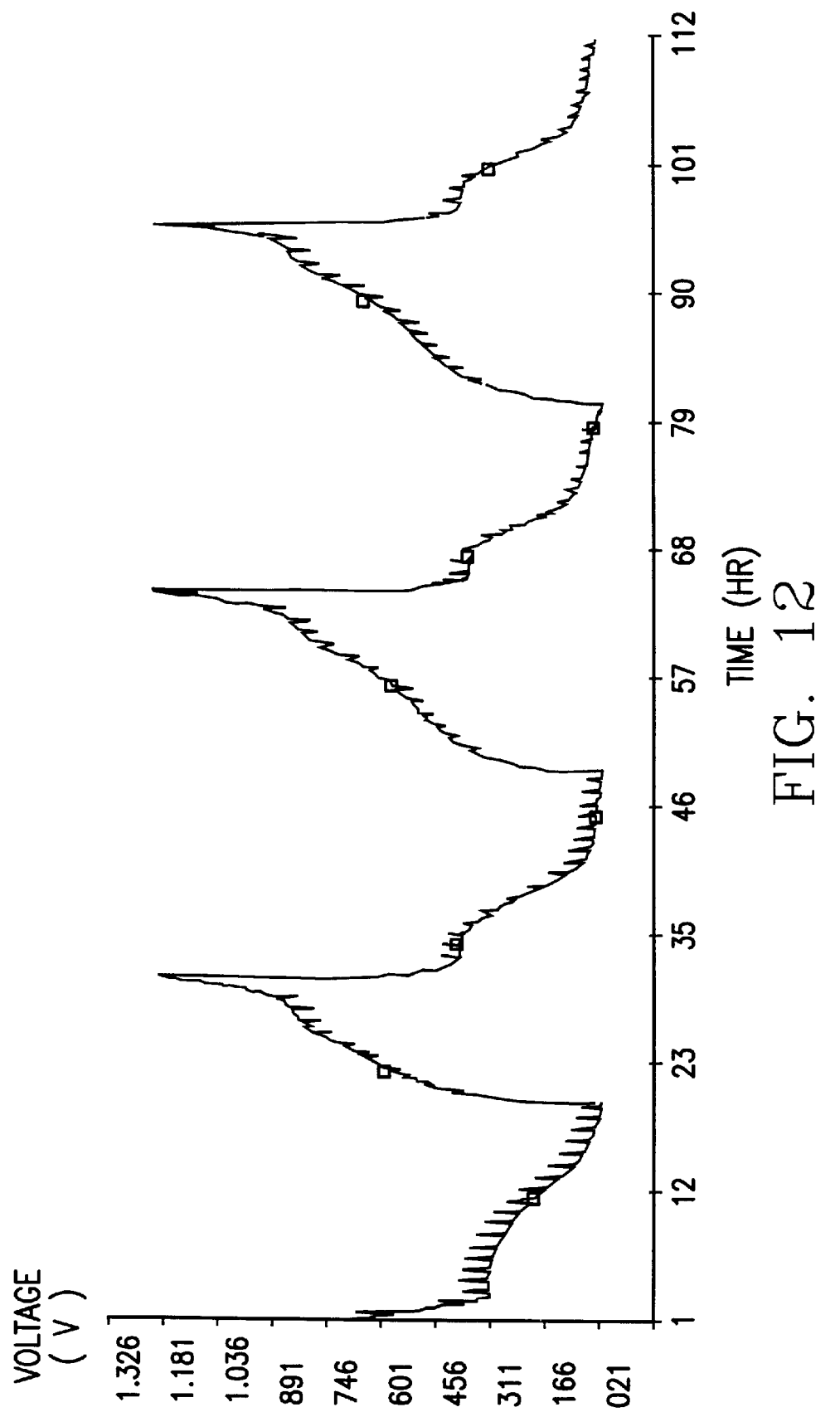
FIG. 12 is a graphical representation similar to FIG. 11 for a $Li/Cu_6Sn_6$ cell.
Figure 13:
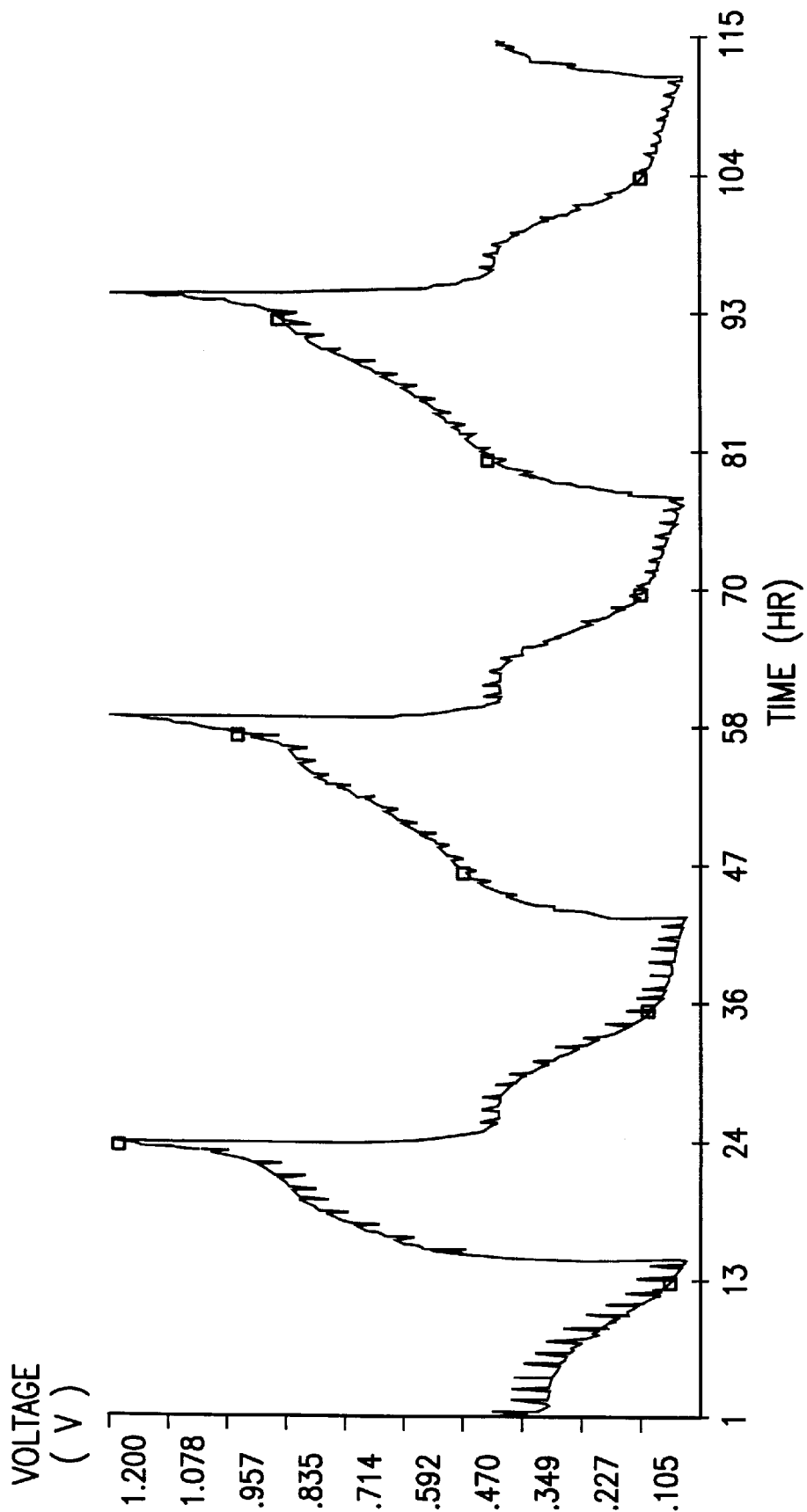
FIG. 13 is a graphical representation similar to FIG. 11 for a $Li/Cu_6Sn_5$ cell.
Figure 14:
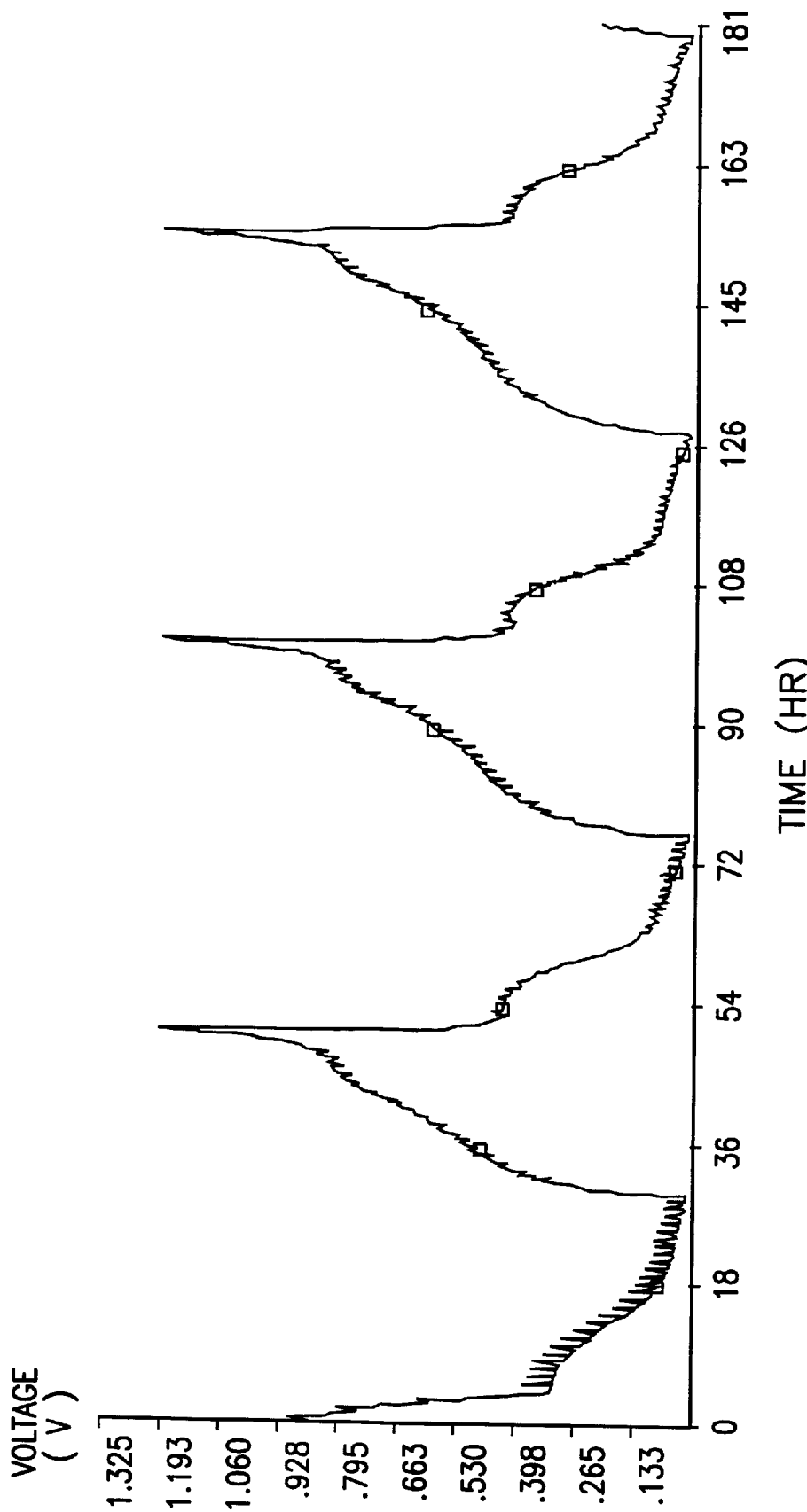
FIG. 14 is a graphical representation similar to FIG. 11 for a $Li/Cu_6Sn_4$ cell.
Figure 17:
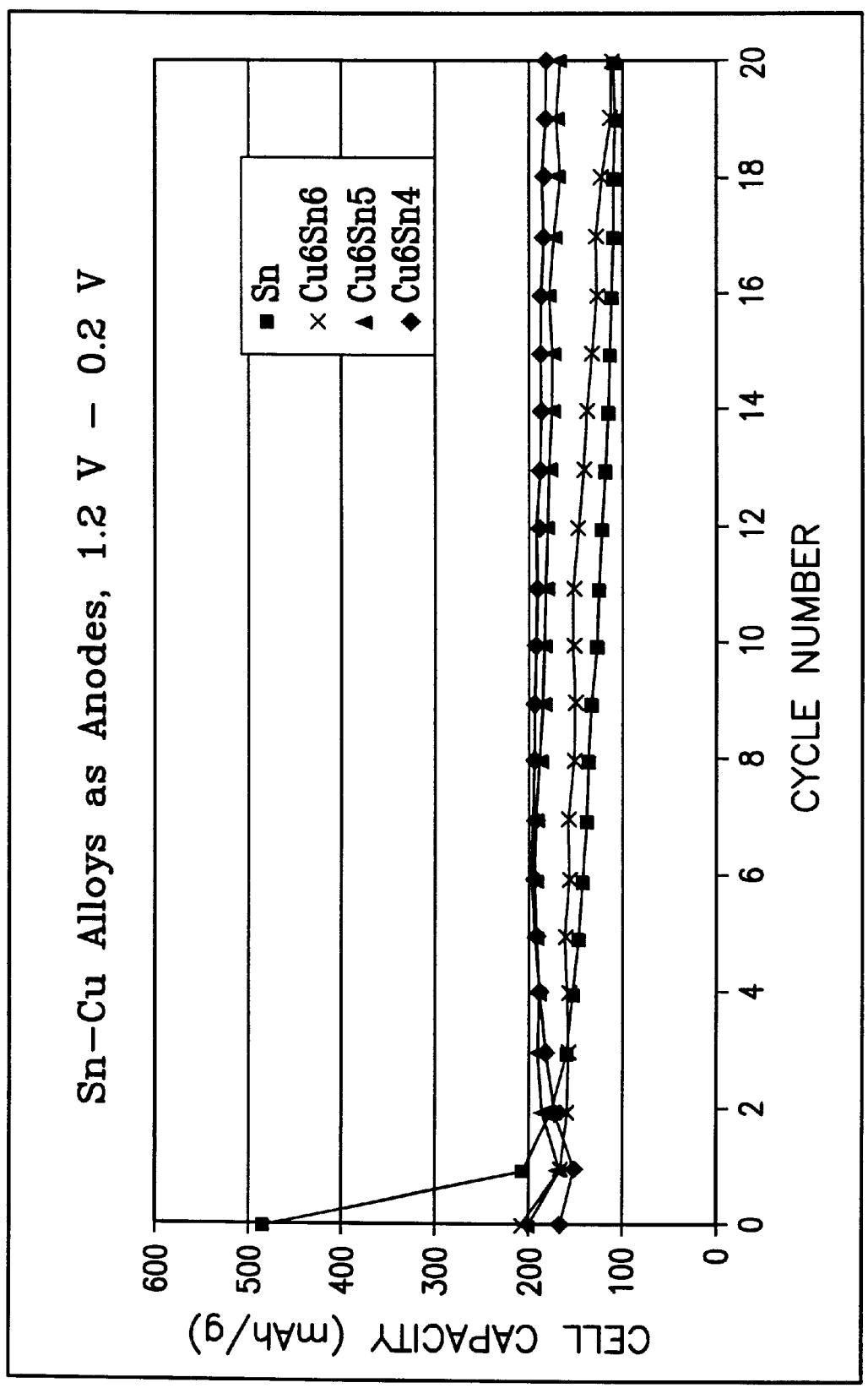
FIG. 17 is a graphical representation similar to FIG. 16 for Li/Sn and $Li/Cu_6Sn_{5+\delta}$ (where $\delta=0,+1,-1$) cells cycled between 1.2 volts and 0.2 volts.

The intermetallic materials were evaluated as electrodes in coin cells (size 1225) 12 mm diameter and 2.5 mm high against a counter lithium electrode. The cells had the configuration: Li/1M LiPF$_6$ in ethylene carbonate, diethyl carbonate (50:50)/Intermetallic electrode. For the intermetallic electrodes, laminates were made containing approximately 6 mg (81%) of the intermetallic compound, intimately mixed with 10% (by weight) binder (Kynar 2801) and 9% (by weight) carbon (XC-72) in tetrahydrofuran (THF). Metallic lithium foil was used as the counter (negative) electrode. Li/Copper-tin cells were charged and discharged at constant current (generally at 0.1 mA), within the voltage range of either 1.2 to 0.0 V, or 1.2 to 0.2 V and Li/InSb cells within the voltage range of 1.2 to 0.5 volts. The electrochemical data from the various intermetallic electrodes are shown in various electrochemical plots, as in FIG. 10: a Li/Cu$_6$Sn$_5$ cell; FIG. 11: a Li/Sn cell (reference); FIG. 12: a Li/Cu$_6$Sn$_6$ cell, FIG. 13; a Li/Cu$_6$Sn$_5$ cell; FIG. 14: a Li/Cu$_6$Sn$_4$ cell; FIG. 15: a Li/Li$_2$CuSn cell; FIG. 16: a collective plot of Li/Sn, Li/Cu$_6$Sn$_6$, Li/Cu$_6$Sn$_5$, Li/Cu$_6$Sn$_4$, Li/Cu$_6$Sn$_2$ and Li/Li$_2$CuSn cells; FIG. 17: a second collective plot of Li/Sn, Li/Cu$_6$Sn$_6$, Li/Cu$_6$Sn$_5$ and Li/Cu$_6$Sn$_4$ cells; FIG. 21: a Li/InSb cell; and FIG. 22: a Li/InSb cell. FIG. 23, a Li/SnSb cell, FIG. 25, a Li/Cu$_{6-x}$Zn$_x$Sn$_5$ (x=1) cell, and FIG. 26, a Li/Cu$_{6-x}$Zn$_x$Sn$_5$ (x=1) and a Li/Cu$_{6-y}$Ni$_y$Sn$_5$ (y=1) cell.

TABLE 1

A comparison of the theoretical gravimetric and volumetric capacities of various negative electrode (anode) materials based on Cu$_6$Sn$_5$ and Li$_2$CuSn-type materials with Li$_x$C$_6$. Volumetric capacities are calculated using the approximate density of the delithiated electrodes

| | Li$_x$C$_6$ | η-Li$_x$ Cu$_6$Sn$_5$ | η'-Li$_x$ Cu$_6$Sn$_5$ | Li$_x$Ni$_3$Sn$_2$ | Li$_x$Co$_3$Sn$_2$ | Li$_x$MgSi |
|---|---|---|---|---|---|---|
| X$_{max}$ | 1 | 13 | 9 | 3 | 3 | 2 |
| Th. Gr. Cap. (mAh/g) | 372 | 358 | 248 | 195 | 194 | 1023 |
| Approx. density of delithiated electrode (g/ml) | 2.2 | 7.0 | 8.3 | 9.0 | 9.0 | 2.2 |
| Th. Vol. Cap. (mAh/ml) | 818 | 2506 | 2058 | 1755 | 1746 | 2251 |

TABLE 2

A list of examples of materials with a lithiated zinc-blende-type structure where the sum of the non lithium atoms equals 2 in a Li$_2$AB structure and A and B are non-lithium atoms.

| | | | |
|---|---|---|---|
| Li$_2$Ag$_x$Bi$_{2-x}$ | Li$_2$Ag$_x$Pb$_{2-x}$ | Li$_2$Ag$_x$Sb$_{2-x}$ | Li$_2$AgSn |
| Li$_2$AuBi | Li$_2$AuGa$_x$ | Li$_2$AuGe | Li$_2$Au$_x$In$_{2-x}$ |
| Li$_2$AuPb | Li$_2$Au$_x$Sb$_{2-x}$ | Li$_2$AuSn | — |
| Li$_2$CdPb | Li$_2$CdSn | Li$_2$CuSb | Li$_2$CuSn |
| Li$_2$GeSn | Li$_2$IrAl | Li$_2$IrGa | Li$_2$IrIn |
| Li$_2$Mg$_x$In | — | — | — |
| Li$_2$MgSi | Li$_2$PdSb | Li$_2$PdGa | Li$_2$PdIn |
| Li$_2$PdPb | Li$_2$PdSb | Li$_2$PtAl | Li$_2$PtGa |
| Li$_2$PtIn | Li$_2$PtSb | Li$_2$RhAl | Li$_2$RhGa |
| Li$_2$RhIn | Li$_2$Zn$_x$Cd$_{2-x}$ Li$_2$ZnSb | Li$_{8.96}$Zn$_{3.20}$Pb$_{3.84}$ | |

Crystallographic Parameters for Li$_2$CuSn

Space Group: F − 43 m; a = 6.27 Å

| Atom | Wyckoff Site | x | y | z | Occupancy (%) |
|---|---|---|---|---|---|
| Li1 | 4(b) | 0.5 | 0.5 | 0.5 | 100 |
| Li2 | 4(c) | 0.25 | 0.25 | 0.25 | 100 |

TABLE 2-continued

A list of examples of materials with a lithiated zinc-blende-type structure where the sum of the non lithium atoms equals 2 in a Li$_2$AB structure and A and B are non-lithium atoms.

| Cu | 4(d) | 0.75 | 0.75 | 0.75 | 100 |
|---|---|---|---|---|---|
| Sn | 4(a) | 0 | 0 | 0 | 100 |

TABLE 3

Relative Capacities of Sn, CuSn, and Cu$_6$Sn$_{5+δ}$ (δ = 0, ±1)

| Electrode | δ in Cu$_6$Sn$_{5+δ}$ | Theor. Capacity* (mAh/g) to LiSn composition | Theor. Capacity* (mAh/g) to Li$_7$Sn$_3$ composition | Theor. Capacity* (mAh/g) to Li$_{4.4}$Sn composition |
|---|---|---|---|---|
| Sn | — | 226 | 527 | 994 |
| CuSn (from Li$_2$CuSn) | (+1) | 147 | 343 | 647 |
| Cu$_6$Sn$_4$ | −1 | 125 | 292 | 551 |
| Cu$_6$Sn$_5$ | 0 | 137 | 320 | 604 |
| Cu$_6$Sn$_6$ | +1 | 147 | 343 | 647 |

*Based on mass of starting electrode

Intermetallic electrodes based on the Cu$_6$Sn$_5$ and Li$_2$CuSn structure types have been discovered to be useful negative electrodes for lithium-ion cells. The new anodes that operate substantially by a topotactic reaction mechanism may provide a significant improvement over the cycling capability of state-of-the-art binary lithium alloy electrodes. Cycling stability of these electrodes is however, gained at the expense of the capacity of the binary lithium alloy systems.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A negative electrode for a non-aqueous electrochemical cell of an intermetallic host structure containing two or more elements selected from the metal elements and silicon, having a hexagonally-close packed NiAs-type structure or a defect-Ni$_2$In-type structure capable of accommodating lithium within its crystallographic host structure such that when lithiated it transforms to a cubic-close-packed structure.

2. The negative electrode of claim 1, wherein the metal atoms are at least partially disordered in the NiAs-type and defect —Ni$_2$In-type structures.

3. The negative electrode of claim 1, wherein the host intermetallic compound is one or more of Cu$_6$Sn$_5$, Cu$_6$Sn$_5$ in which the Cu ions are partially substituted by Zn and/or Ni.

4. The negative electrode of claim 1, wherein the host intermetallic structure includes two or more elements selected from Sn, Si, Al, Ga, Ge, In, Pb, Zn, Cd, Hg, Sb, Cu, Ni, Co, Fe, Mn, Cr, V, Ti, Mg, Ca and Ag.

5. The negative electrode of claim 1, wherein the host intermetallic structure contains additional lithium as free lithium metal or as an integral part of the intermetallic structure.

6. The negative electrode of claim 1, which when overlithiated, a Li$_3$Sb-related structure is present in the negative electrode.

7. The negative electrode of claim 1, wherein carbon is present in a composite matrix.

8. The negative electrode of claim 7, wherein graphite is present in the composite matrix.

9. The negative electrode of claim 4, wherein the host intermetallic structure includes two or more elements selected from Sn, Si, Al, Ga, Zn, Cu, Ni, Co, and Mg.

10. The negative electrode of claim 1, wherein the metal atoms and lithium atoms are at least partially disordered in the cubic-close-packed structures.

11. The negative electrode of claim 1, wherein the cubic-close-packed structure is $Li_2CuSn$.

12. The negative electrode of claim 1, wherein the cubic-close-packed structure is $Li_2CuSn$.

13. The negative electrode of claim 1, wherein the cubic-close-packed structure is $Li_2MgSi$.

14. The negative electrode of claim 1, wherein the intermetallic host structure is particulate having an average particle size of less than about 40 microns.

15. The negative electrode of claim 1, wherein the intermetallic host structure transforms on lithiation to a cubic-close-packed structure in the presence of an additional, substantially active alloying element or elements with respect to lithium or substantially inactive non-alloying element or elements with respect to lithium or both.

16. The negative electrode of claim 1, wherein the metal atoms of the intermetallic host structure are partially substituted by less than 50 atom percent of a non-metal selected from B, C, N, O, F, P, S, Cl, As, Se, Br, Te and I.

17. The negative electrode of claim 1, wherein the metal atoms of the intermetallic host structure are partially substituted by less than 20 atom percent of a non-metal.

18. The negative electrode of claim 17, wherein the metal atoms of the intermetallic host structure are partially substituted by less than 10 atom percent of a non-metal.

19. A negative electrode for a non-aqueous electrochemical cell consisting of an intermetallic host structure containing two or more elements selected from Sn, Si, Al, Ga, Ge, In, Pb, Zn, Cd, Hg, Sb, Cu, Ni, Co, Fe, Mn, Cr, V, Ti, Mg, Ca and Ag, capable of accommodating lithium within its crystallographic host structure such that when lithiated it transforms by a substantially topotactic phase transition mechanism to a cubic-close-packed structure.

20. A non-aqueous electrochemical cell comprising a negative electrode, an electrolyte and a positive electrode, the negative electrode consisting of an intermetallic host structure containing two or more elements selected from the metal elements and silicon, having a hexagonally-close-packed NiAs-type structure or a defect-$Ni_2In$ type structure capable of accommodating lithium within its crystallographic host structure such that when lithiated it transforms to a cubic-close-packed structure.

21. The non-aqueous electrochemical cell of claim 20, wherein the host intermetallic structure includes two or more elements selected from Sn, Si, Al, Ga, Ge, In, Pb, Zn, Cd, Hg, Sb, Cu, Ni, Co, Fe, Mn, Cr, V, Ti, Mg, Ca and Ag.

22. The non-aqueous electrochemical cell of claim 20, wherein the cubicclose-packed type structure of the negative electrode is $Li_2CuSn$.

23. The non-aqueous electrochemical cell of claim 21, wherein the cubic close-packed type structure of the negative electrode is derived from $Cu_6Sn_5$.

24. A method of making an electrochemical cell comprising providing a negative electrode, providing an electrolyte and providing a positive electrode, the negative electrode consisting of an intermetallic host structure containing two or more elements selected from the metal elements and silicon, having a hexagonally-closepacked NiAs-type structure or a defect-$Ni_2In$-type structure capable of accommodating lithium within its crystallographic host structure such that when lithiated it transforms to a cubic-close-packed type structure and assembling the electrodes and electrolyte into an electrochemical cell.

25. The method of claim 24, wherein the electrochemical cell is assembled in its discharged state with substantially no lithium in the negative anode.

26. The method of claim 24, wherein the electrochemical cell is assembled in its charged or partially charged state with lithium in the negative electrode.

27. The method of claim 24, wherein the electrochemical cell contains additional lithium as free lithium metal or as integral part of intermetallic electrode structure.

28. The method of claim 24, wherein the electrochemical cell contains a negative electrode which can be overlithiated to provide additional capacity or a voltage indicator to signal the end-of-charge in the electrochemical cell.

29. A non-aqueous battery comprising a plurality of cells electrically connected, each cell comprising a negative electrode, an electrolyte and a positive electrode, the negative electrode consisting of an intermetallic host structure containing two or more elements selected from the metal elements and silicon, having a hexagonally-close-packed NiAs-type structure or a defect-$Ni_2In$-type structure capable of accommodating lithium within its crystallographic host structure such that when lithiated it transforms to a cubic-close-packed type structure.

30. A negative electrode for a non-aqueous electrochemical cell of an intermetallic host structure containing two or more elements selected from the metal elements and silicon, with a NiAs or defect—$Ni_2In$ type structure, capable of accommodating lithium within its crystallographic host structure such that when lithiated it transforms to a lithiated NiAs-type structure.

31. The negative electrode of claim 30, wherein there is additional lithium present as free lithium or as an integral part of the intermetallic electrode structure.

32. The negative electrode of claim 30, which when overlithiated, a $Li_3Sb$-type structure is present in the negative electrode.

33. The negative electrode of claim 30, wherein carbon is present in a composite matrix.

34. The negative electrode of claim 30, wherein graphite is present in a composite matrix.

35. A method of making an electrochemical cell comprising providing a negative electrode, providing an electrolyte and providing a positive electrode, the negative electrode consisting of an intermetallic host structure containing two or more elements selected from the metal elements and silicon, with a NiAs or defect—$Ni_2In$-type structure, capable of accommodating lithium within its crystallographic host structure such that when lithiated it transforms to a lithiated NiAs-type structure, and assembling the electrodes and electrolyte to form an electrochemical cell.

36. The method of claim 35, wherein the electrochemical cell is assembled in its discharged state with substantially no lithium in the negative anode.

37. The method of claim 35, wherein the electrochemical cell is assembled in its charged or partially charged state with lithium in the negative electrode.

38. The method of claim 33, wherein the electrochemical cell contains additional lithium as free lithium metal or as an integral part of an intermetallic electrode structure.

39. The method of claim 35, wherein the electrochemical cell contains a negative electrode which can be overlithiated to provide additional capacity or a voltage indicator to signal the end-of-charge in the electrochemical cell.

40. A non-aqueous battery comprising a plurality of cells electrically connected, each cell comprising a negative electrode, an electrolyte and a positive electrode, the negative electrode consisting of an intermetallic host structure containing two or more elements selected from the metal elements and silicon with a NiAs or defect—$Ni_2In$-type structure, capable of accommodating lithium within its crystallographic host structure such that when lithiated it transforms to a lithiated NiAs-type structure.

41. The non-aqueous battery of claim 40, which when the negative electrode is overlithiated, a $Li_3Sb$-type structure is present in the negative electrode.

* * * * *